(12) United States Patent
Dodworth

(10) Patent No.: US 12,053,963 B2
(45) Date of Patent: *Aug. 6, 2024

(54) HIGH-STRENGTH LOW-HEAT RELEASE COMPOSITES

(71) Applicant: BRIGHT LITE STRUCTURES LLC, San Fransico, CA (US)

(72) Inventor: Antony Dodworth, Stamford (GB)

(73) Assignee: BRIGHT LITE STRUCTURES LLC, San Fransisco (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/294,953

(22) PCT Filed: Nov. 19, 2019

(86) PCT No.: PCT/US2019/062138
§ 371 (c)(1),
(2) Date: May 18, 2021

(87) PCT Pub. No.: WO2020/106678
PCT Pub. Date: May 28, 2020

(65) Prior Publication Data
US 2022/0032573 A1   Feb. 3, 2022

Related U.S. Application Data

(60) Provisional application No. 62/769,446, filed on Nov. 19, 2018.

(51) Int. Cl.
*B32B 27/12*   (2006.01)
*B29C 70/02*   (2006.01)
(Continued)

(52) U.S. Cl.
CPC ............ *B32B 27/12* (2013.01); *B29C 70/026* (2013.01); *B29C 70/06* (2013.01); *B32B 3/12* (2013.01);
(Continued)

(58) Field of Classification Search
CPC ....... B29C 70/026; B29C 70/06; B32B 15/02; B32B 15/08; B32B 15/085; B32B 15/09;
(Continued)

(56) References Cited

U.S. PATENT DOCUMENTS 2,882,673 A   4/1959   Heinrich
3,051,992 A   9/1962   Bradley
(Continued)

FOREIGN PATENT DOCUMENTS

CA   201566184 U   9/2010
CA   201755923 U   3/2011
(Continued)

OTHER PUBLICATIONS

Translation of JP 2006 289646 A, Shima et al., Oct. 26, 2006. (Year: 2006).*

(Continued)

*Primary Examiner* — Hai Vo
(74) *Attorney, Agent, or Firm* — Dorsey & Whitney LLP

(57) ABSTRACT

Embodiments disclosed herein relate to composite laminate structures having high bending stiffness and low heat release properties and methods of making the same.

20 Claims, 5 Drawing Sheets

(51) Int. Cl.
  *B29C 70/06* (2006.01)
  *B32B 3/12* (2006.01)
  *B32B 5/18* (2006.01)
  *B32B 15/08* (2006.01)
  *B32B 27/06* (2006.01)
  *B32B 27/28* (2006.01)
  *B32B 27/38* (2006.01)
  *B32B 27/40* (2006.01)

(52) U.S. Cl.
  CPC ............... *B32B 5/18* (2013.01); *B32B 15/08* (2013.01); *B32B 27/065* (2013.01); *B32B 27/285* (2013.01); *B32B 27/288* (2013.01); *B32B 27/38* (2013.01); *B32B 27/40* (2013.01); *B32B 2250/24* (2013.01); *B32B 2260/046* (2013.01); *B32B 2262/101* (2013.01); *B32B 2262/106* (2013.01); *B32B 2266/0257* (2013.01); *B32B 2307/102* (2013.01); *B32B 2307/304* (2013.01); *B32B 2307/546* (2013.01)

(58) Field of Classification Search
  CPC ......... B32B 15/14; B32B 15/18; B32B 15/20; B32B 2250/05; B32B 2250/24; B32B 2260/023; B32B 2260/046; B32B 2262/0253; B32B 2262/101; B32B 2262/106; B32B 2264/0214; B32B 2264/10; B32B 2264/102; B32B 2264/104; B32B 2264/105; B32B 2266/025; B32B 2266/0257; B32B 2266/0278; B32B 2266/06; B32B 2266/08; B32B 2270/00; B32B 2305/076; B32B 2307/102; B32B 2307/30; B32B 2307/302; B32B 2307/304; B32B 2307/4026; B32B 2307/50; B32B 2307/54; B32B 2307/546; B32B 2307/56; B32B 2307/72; B32B 2307/732; B32B 2605/08; B32B 2605/10; B32B 2605/12; B32B 2605/18; B32B 2607/00; B32B 27/065; B32B 27/08; B32B 27/10; B32B 27/12; B32B 27/281; B32B 27/285; B32B 27/288; B32B 27/308; B32B 27/32; B32B 27/322; B32B 27/36; B32B 27/365; B32B 27/38; B32B 27/40; B32B 29/007; B32B 29/02; B32B 3/12; B32B 3/20; B32B 5/024; B32B 5/18; B32B 5/20; B32B 5/245; B32B 5/26
  See application file for complete search history.

(56) References Cited

U.S. PATENT DOCUMENTS

| | | |
|---|---|---|
| 3,303,733 A | 2/1967 | Sheffield et al. |
| 3,314,582 A | 4/1967 | Haigler |
| 3,484,398 A | 12/1969 | Childs |
| 3,906,137 A | 9/1975 | Bauer |
| 4,543,289 A | 9/1985 | Park |
| 4,598,007 A | 7/1986 | Kourtides et al. |
| 4,687,691 A | 8/1987 | Kay et al. |
| 4,940,563 A | 7/1990 | Kromrey |
| 4,983,247 A | 1/1991 | Kim |
| 5,034,256 A | 7/1991 | Santiso, III et al. |
| 5,484,500 A | 1/1996 | Kaufmann et al. |
| 5,540,870 A | 7/1996 | Quigley |
| 5,645,926 A | 7/1997 | Horrocks et al. |
| 5,683,782 A | 11/1997 | Duchene et al. |
| 5,716,697 A | 2/1998 | Meeker |
| 5,756,182 A | 5/1998 | Landi et al. |
| 5,819,514 A | 10/1998 | Firdaus |
| 5,979,531 A | 11/1999 | Barr et al. |
| 6,038,949 A | 3/2000 | Jander |
| 6,139,942 A | 10/2000 | Hartness et al. |
| 6,197,146 B1 | 3/2001 | Sucic et al. |
| 6,251,185 B1 | 6/2001 | Morrison et al. |
| 8,028,736 B2 | 10/2011 | Jander |
| 8,334,055 B2 | 12/2012 | Le Gall et al. |
| 8,556,358 B2 | 10/2013 | Fitzgerald et al. |
| RE44,893 E | 5/2014 | Raghavendran et al. |
| 8,777,136 B2 | 7/2014 | Jander |
| 2002/0010973 A1 | 1/2002 | Dumlao et al. |
| 2002/0045696 A1 | 4/2002 | Sullivan et al. |
| 2002/0106503 A1 | 8/2002 | Monk et al. |
| 2002/0176979 A1 | 11/2002 | Evans |
| 2003/0098520 A1 | 5/2003 | Cournoyer et al. |
| 2003/0130411 A1 | 7/2003 | Ishikawa et al. |
| 2003/0175455 A1 | 7/2003 | Erb et al. |
| 2004/0028877 A1 | 2/2004 | Itoh et al. |
| 2006/0048311 A1 | 3/2006 | Lee |
| 2006/0065152 A1 | 3/2006 | Heitmeyer et al. |
| 2006/0251902 A1 | 11/2006 | Botrie et al. |
| 2007/0092716 A1 | 4/2007 | Guo et al. |
| 2007/0125042 A1 | 6/2007 | Hughes et al. |
| 2007/0256379 A1 | 11/2007 | Edwards |
| 2008/0223857 A1 | 9/2008 | Palley et al. |
| 2009/0072086 A1* | 3/2009 | Smith ....................... B32B 3/12 428/116 |
| 2009/0227162 A1 | 9/2009 | Kruckenberg et al. |
| 2010/0021718 A1 | 1/2010 | Vos et al. |
| 2010/0255283 A1 | 10/2010 | Monk et al. |
| 2010/0261000 A1 | 10/2010 | Jones |
| 2011/0089183 A1 | 4/2011 | Gundelsheimer |
| 2011/0143087 A1 | 6/2011 | Alberding et al. |
| 2011/0180959 A1 | 7/2011 | Donnelly et al. |
| 2011/0272509 A1 | 11/2011 | Jander |
| 2012/0098300 A1 | 4/2012 | Murray |
| 2012/0126387 A1 | 5/2012 | Fishley et al. |
| 2012/0141765 A1 | 6/2012 | Katahira et al. |
| 2012/0177874 A1 | 7/2012 | Brandon et al. |
| 2012/0196079 A1 | 8/2012 | Brauers et al. |
| 2012/0204741 A1 | 8/2012 | Bremmer et al. |
| 2013/0101822 A1 | 4/2013 | Kunal et al. |
| 2013/0171381 A1 | 7/2013 | Grove-Nielsen |
| 2013/0203878 A1 | 8/2013 | Igualada et al. |
| 2013/0224410 A1 | 8/2013 | Nozawa |
| 2013/0273308 A1 | 10/2013 | Day et al. |
| 2013/0284003 A1 | 10/2013 | Dodworth |
| 2013/0292076 A1 | 11/2013 | Raghavendran et al. |
| 2013/0323429 A1 | 12/2013 | Strobel et al. |
| 2014/0011016 A1 | 1/2014 | Vanimisetti et al. |
| 2014/0145470 A1 | 5/2014 | Preisler et al. |
| 2015/0166743 A1 | 6/2015 | Restuccia et al. |
| 2017/0057823 A1 | 3/2017 | Hart et al. |
| 2017/0087798 A1* | 3/2017 | Dodworth ................ B32B 3/12 |
| 2017/0095997 A1 | 4/2017 | Dodworth |
| 2017/0218141 A1 | 8/2017 | Nosker et al. |
| 2017/0283571 A1 | 10/2017 | Taketa et al. |
| 2018/0346146 A1* | 12/2018 | Sang ....................... B32B 9/007 |
| 2022/0009198 A1* | 1/2022 | Dodworth ................ B32B 5/24 |
| 2022/0032573 A1 | 2/2022 | Dodworth |
| 2023/0398772 A1* | 12/2023 | Dodworth ............. B29C 70/026 |

FOREIGN PATENT DOCUMENTS

| | | | |
|---|---|---|---|
| CA | 102227521 A | 10/2011 | |
| CA | 102271888 A | 12/2011 | |
| CA | 102548741 A | 7/2012 | |
| CA | 203077713 U | 7/2013 | |
| CA | 104254439 A | 12/2014 | |
| CN | 101946051 A | 1/2011 | |
| CN | 103079805 A | 5/2013 | |
| CN | 106457739 A | 2/2017 | |
| DE | 4111638 A | * 10/1992 | ............ B32B 27/04 |
| DE | 102008035918 A1 | 2/2010 | |
| DE | 102013225730 A1 | 6/2015 | |
| EP | 0352993 A1 | 1/1990 | |
| EP | 0478033 A1 | 4/1992 | |
| EP | 0605235 A2 | 7/1994 | |
| EP | 0628406 A2 | 12/1994 | |
| EP | 0794051 A1 | 9/1997 | |

(56) References Cited

FOREIGN PATENT DOCUMENTS

| | | | |
|---|---|---|---|
| EP | 0798107 A2 | 10/1997 | |
| EP | 1464483 A1 | 10/2004 | |
| EP | 1789250 B1 | 5/2016 | |
| FR | 2890893 A1 | 3/2007 | |
| GB | 2101930 A | 1/1983 | |
| GB | 2300380 A | 11/1996 | |
| JP | Y1965027900 | 9/1965 | |
| JP | 51041764 A | 4/1976 | |
| JP | S5334866 Y2 | 8/1978 | |
| JP | S55-049251 A | 4/1980 | |
| JP | S57113695 U | 7/1982 | |
| JP | 01320145 A | 12/1989 | |
| JP | H0288227 A | 3/1990 | |
| JP | H03-099812 A | 4/1991 | |
| JP | H03109145 A | 5/1991 | |
| JP | H05132540 A | 5/1993 | |
| JP | H06270304 A | 9/1994 | |
| JP | 06344477 A | 12/1994 | |
| JP | 07047626 A | 2/1995 | |
| JP | H0718081 U | 3/1995 | |
| JP | 07125118 A | 5/1995 | |
| JP | H07180281 A | 7/1995 | |
| JP | H07256803 A | 10/1995 | |
| JP | H08258189 A | 10/1996 | |
| JP | H11-25453 | 1/1999 | |
| JP | H11207843 A | 8/1999 | |
| JP | 11247356 A | 9/1999 | |
| JP | H11254563 A | 9/1999 | |
| JP | 2000006145 A | 1/2000 | |
| JP | 2000043171 A | 2/2000 | |
| JP | 2001031838 A | 2/2001 | |
| JP | 2001511827 A | 8/2001 | |
| JP | 2003025360 A | 1/2003 | |
| JP | 2004017355 A | 1/2004 | |
| JP | 2006188688 A | 7/2006 | |
| JP | 2006289646 A * | 10/2006 | ............. B32B 27/04 |
| JP | 2007530320 A | 11/2007 | |
| JP | 2007331369 A | 12/2007 | |
| JP | 2008230235 A | 10/2008 | |
| JP | 2008238566 A | 10/2008 | |
| JP | 2009535530 A | 10/2009 | |
| JP | 2010149260 A | 7/2010 | |
| JP | 2012126387 A | 7/2012 | |
| JP | 2013001006 A | 1/2013 | |
| JP | 2013032510 A | 2/2013 | |
| JP | 2013520328 A | 6/2013 | |
| JP | 2014533751 A | 12/2014 | |
| JP | 2015504799 A | 2/2015 | |
| JP | 2017518907 A | 7/2017 | |
| JP | 2021527244 A | 10/2021 | |
| WO | 90/00968 | 2/1990 | |
| WO | 92/10362 | 6/1992 | |
| WO | 92/12855 A | 8/1992 | |
| WO | 2003101719 A2 | 12/2003 | |
| WO | 2009011304 A1 | 1/2009 | |
| WO | 2009157295 A1 | 12/2009 | |
| WO | 2013178755 A1 | 12/2013 | |
| WO | 2014130751 A1 | 8/2014 | |
| WO | 2015187873 A1 | 12/2015 | |
| WO | 2015187879 A1 | 12/2015 | |
| WO | 2016028359 A2 | 2/2016 | |
| WO | 2016178755 A1 | 11/2016 | |
| WO | 2017120025 A1 | 7/2017 | |
| WO | 2018050827 A2 | 3/2018 | |

OTHER PUBLICATIONS

Translation of DE 4111638 A, Greening. Oct. 15, 1992 (Year: 1992).*
Advisory Action for U.S. Appl. No. 15/560,831 mailed Apr. 6, 2020.
Corrected Notice of Allowability for U.S. Appl. No. 15/311,606 mailed Aug. 17, 2020.
Corrected Notice of Allowability for U.S. Appl. No. 15/311,703 mailed Aug. 19, 2020.
Corrected Notice of Allowability for U.S. Appl. No. 15/311,703 mailed Aug. 31, 2020.
Final Office Action for U.S. Appl. No. 15/560,831 mailed Feb. 4, 2020.
International Search Report and Written Opinion from International Application No. PCT/US2015/034051 mailed Nov. 3, 2015.
International Search Report and Written Opinion from International Application No. PCT/US2015/034061 mailed Aug. 19, 2015.
International Search Report and Written Opinion from International Application No. PCT/US2015/034070 mailed Feb. 1, 2016.
International Search Report and Written Opinion from International Application No. PCT/US2015/034072 mailed Nov. 2, 2015.
International Search Report and Written Opinion from International Application No. PCT/US2016/025270 mailed Jun. 24, 2016.
International Search Report and Written Opinion from International Application No. PCT/US2019/062138 mailed Mar. 19, 2020.
International Search Report and Written Opinion from International Application No. PCT/US2019/062139 mailed Mar. 19, 2020.
Issue Notification for U.S. Appl. No. 15/311,271 mailed Aug. 21, 2019.
Issue Notification for U.S. Appl. No. 15/311,344 mailed Aug. 14, 2019.
Issue Notification for U.S. Appl. No. 15/311,606 mailed Sep. 3, 2020.
Issue Notification for U.S. Appl. No. 15/311,703 mailed Sep. 9, 2020.
Non-Final Office Action for U.S. Appl. No. 15/311,271 mailed Nov. 19, 2018.
Non-Final Office Action for U.S. Appl. No. 15/311,344 mailed Jan. 11, 2018.
Non-Final Office Action for U.S. Appl. No. 15/311,606 mailed May 9, 2019.
Non-Final Office Action for U.S. Appl. No. 15/311,703 mailed Jun. 17, 2019.
Non-Final Office Action for U.S. Appl. No. 15/311,703 mailed Sep. 18, 2018.
Non-Final Office Action for U.S. Appl. No. 15/560,831 mailed Aug. 29, 2019.
Non-Final Office Action for U.S. Appl. No. 15/560,831 mailed May 29, 2020.
Notice of Allowance for U.S. Appl. No. 15/311,271 mailed May 1, 2019.
Notice of Allowance for U.S. Appl. No. 15/311,344 mailed Apr. 25, 2019.
Notice of Allowance for U.S. Appl. No. 15/311,344 mailed Jan. 15, 2019.
Notice of Allowance for U.S. Appl. No. 15/311,344 mailed Jun. 20, 2018.
Notice of Allowance for U.S. Appl. No. 15/311,344 mailed Sep. 28, 2018.
Notice of Allowance for U.S. Appl. No. 15/311,606 mailed Jan. 23, 2019.
Notice of Allowance for U.S. Appl. No. 15/311,606 mailed Jan. 29, 2020.
Notice of Allowance for U.S. Appl. No. 15/311,606 mailed May 11, 2020.
Notice of Allowance for U.S. Appl. No. 15/311,606 mailed Sep. 30, 2019.
Notice of Allowance for U.S. Appl. No. 15/311,703 mailed Feb. 5, 2020.
Notice of Allowance for U.S. Appl. No. 15/311,703 mailed Mar. 5, 2019.
Notice of Allowance for U.S. Appl. No. 15/311,703 mailed May 11, 2020.
Notice of Allowance for U.S. Appl. No. 15/311,703 mailed Oct. 23, 2019.
Notice of Allowance for U.S. Appl. No. 15/560,831 mailed Dec. 9, 2020.
Notice of Allowance for U.S. Appl. No. 15/560,831 mailed Sep. 4, 2020.
Restriction Requirement for U.S. Appl. No. 15/311,271 mailed Aug. 28, 2018.

(56) References Cited

OTHER PUBLICATIONS

Restriction Requirement for U.S. Appl. No. 15/311,344 mailed Oct. 20, 2017.
Restriction Requirement for U.S. Appl. No. 15/311,606 mailed Jun. 7, 2018.
Restriction Requirement for U.S. Appl. No. 15/311,703 mailed Jun. 27, 2018.
Restriction Requirement for U.S. Appl. No. 15/560,831 mailed Apr. 2, 2019.
Restriction Requirement for U.S. Appl. No. 16/537,051 mailed Sep. 21, 2020.
U.S. Appl. No. 16/537,051, filed Aug. 9, 2019.
U.S. Appl. No. 62/007,614, filed Jun. 4, 2014.
U.S. Appl. No. 62/007,632, filed Jun. 4, 2014.
U.S. Appl. No. 62/007,652, filed Jun. 4, 2014.
U.S. Appl. No. 62/007,670, filed Jun. 4, 2014.
U.S. Appl. No. 62/007,685, filed Jun. 4, 2014.
U.S. Appl. No. 62/108,837, filed Jan. 28, 2015.
U.S. Appl. No. 62/142,722, filed Apr. 3, 2015.
U.S. Appl. No. 62/769,446, filed Nov. 19, 2018.
U.S. Appl. No. 62/769,452, filed Nov. 19, 2018.
"Araldite FST 40002/40003 FST Composite System for Aerospace Interior", Huntsman Advanced Materials Flyer, 2014, pp. 1-2.
"Araldite FST 40004/40005 FST Composite System for Railway", Huntsman Advanced Materials Flyer, 2016, pp. 1-2.
"Araldite, Solutions or Automotive Mass Production", Huntsman Advanced Materials Flyer, 2014, pp. 1-2.
"High-tensile strength, high-modulus carbon fiber", CompositesWorld,http://www.compositesworld.com/products/high-tensile-strength-high-modulus-carbon-fiber, retrieved on Oct. 1, 2015, Mar. 10, 2014.
"Tough Sandwich Design Lightens Load Floor in Crossover SUV", Composites Technology, Retrieved Nov. 22, 2016, Jun. 1, 2008.
Bosch, "New Sandwich Composites: For Lightweight Construction in the Automotive Industry", JEC Magazine #45, Retrieved Nov. 22, 2016, Nov.-Dec. 2008.
Restriction Requirement for U.S. Appl. No. 17/294,981 mailed May 18, 2023.
Non-Final Office Action for U.S. Appl. No. 17/294,981 mailed Aug. 30, 2023.
Shen, et al., "Mechanical Properties and Tensile Fatigue of Graphene Nanoplatelets Reinforced Polymer Nanocomposites", http://dx.doi.org/11.1155/2013/565401, 2013, 9 pages.

* cited by examiner

HIGH-STRENGTH LOW-HEAT RELEASE COMPOSITES

CROSS-REFERENCE TO RELATED APPLICATIONS

This application claims priority to U.S. Provisional Application No. 62/769,446 filed on 19 Nov. 2018, the disclosure which is incorporated herein in its entirety by this reference.

BACKGROUND

Composite components may significantly reduce weight, improve fuel efficiency, and reduce carbon emissions compared with traditional manufacturing methods. Composites may include carbon fibers or glass fibers embedded in a resin. Currently, composite components are often fabricated by conventional molding processes, including resin transfer molding (RTM), sheet molding, etc. Composite components may also be formed of pre-impregnated fibers ("pre-preg") and may require an oven or autoclave to cure the pre-preg. Traditionally, fiber reinforced composite components are not cost competitive compared to metal components for several reasons. First, the high pressure RTM may require relatively expensive equipment, and high pressure to flow a polymer resin to impregnate the fibers and to reduce surface defects (e.g., pin holes or undesired porosity). The production yield for RTM parts is relatively low due to surface defects.

Composite parts exhibit various heat release values depending upon the material(s) therein. Heat release can be determined by burning a composite component and monitoring the amount of heat produced as the component burns. Often, when a composite component with a relatively low heat release is desired, phenolic resin is used in the composite component.

Manufacturers continue to search for materials, tooling, and production techniques to form composite components.

SUMMARY

Embodiments disclosed herein relate to composite structures having high bending stiffness and low heat release properties. In an embodiment, a composite sandwich structure is disclosed. The composite sandwich structure includes a thermoplastic layer including a high-temperature thermoplastic polymer. The composite sandwich structure includes a first thermoset layer disposed on the thermoplastic layer. The composite sandwich structure includes a core positioned on the first thermoset layer, wherein the core includes a plurality of cells. The composite sandwich structure includes a second thermoset layer disposed on the core substantially opposite the first thermoset layer. The composite sandwich structure has a heat release below 60 kW*min/m$^2$.

In an embodiment, a composite sandwich structure is disclosed. The composite sandwich structure includes a thermoplastic layer including a high-temperature thermoplastic polymer. The composite sandwich structure includes a first thermoset layer disposed on the thermoplastic layer. The composite sandwich structure includes a core positioned on the first thermoset layer, wherein the core includes a plurality of cells. The composite sandwich structure includes a second thermoset layer disposed on the core substantially opposite the first thermoset layer. The composite sandwich structure includes an additional thermoplastic layer including the high-temperature thermoplastic polymer. The composite sandwich structure has a heat release below 60 kW*min/m$^2$.

In an embodiment, a composite sandwich structure is disclosed. The composite sandwich structure includes a thermoplastic layer including a high-temperature thermoplastic polymer. The composite sandwich structure includes an additional thermoplastic layer disposed on the thermoplastic layer, the additional thermoplastic layer including the high-temperature thermoplastic polymer. The composite sandwich structure includes a first thermoset layer disposed on the additional thermoplastic layer. The composite sandwich structure includes a core positioned on the first thermoset layer, wherein the core includes a plurality of cells. The composite sandwich structure includes a second thermoset layer disposed on the core substantially opposite the first thermoset layer. The composite sandwich structure has a heat release below 60 kW*min/m$^2$.

In an embodiment, a method of making a composite is disclosed. The method includes forming a lay-up. The lay-up includes at least one thermoplastic layer including a high-temperature thermoplastic polymer, the at least one thermoplastic layer being an outermost layer of the lay-up. The lay-up includes a first thermoset layer. The lay-up includes a second thermoset layer. The lay-up includes a core disposed between the first thermoset layer and the second thermoset layer, wherein the core includes a plurality of cells. The method includes pressing the lay-up in a mold. The method includes curing the lay-up in the mold to form a composite sandwich-having a heat release below 60 kW*min/m$^2$.

In an embodiment, a monolithic composite is disclosed. The monolithic composite includes at least one thermoplastic layer having a plurality of fibers and a high-temperature thermoplastic resin therein, wherein the at least one thermoplastic layer exhibits a heat release a heat release below 60 kW*min/m$^2$.

In an embodiment, a method of making a monolithic composite is disclosed. The method includes forming a lay-up including at least one thermoplastic layer having a high-temperature thermoplastic resin and a plurality of fibers therein. The method includes forming the lay-up into a selected shape. The method includes curing the lay-up to form a monolithic composite having a heat release below 60 kW*min/m$^2$.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Figure 1:
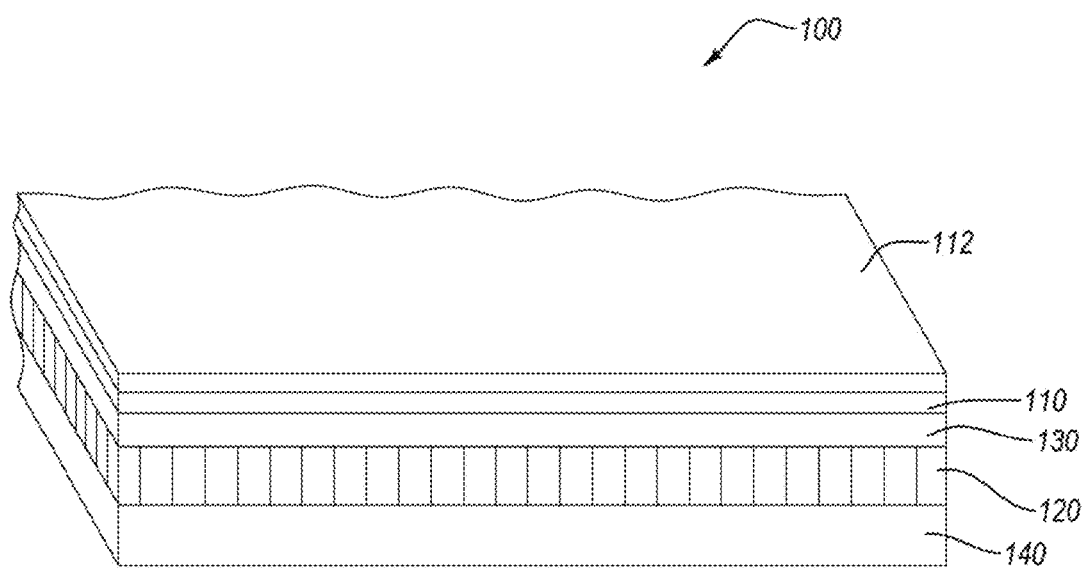
FIG. 1 is an isometric view of a composite sandwich, according to an embodiment.

Embodiments disclosed herein relate to composite structures containing a thermoplastic layer bonded to a thermoset layer. More specifically, embodiments relate to combinations of polymer resin compositions and properties, apparatus and methods for applying the polymer resin to form fiber-reinforced composite structures, and fiber reinforced composite structures containing the polymer resins. The polymer resins in adjacent layers in the fiber reinforced composite structures include a thermoset resin and a thermoplastic resin, respectively. The thermoplastic resin and layers having the same disclosed herein provide for excellent heat release characteristics when disposed at or near an outermost (e.g., front-facing) surface of the composite structure. The composite structures may include composite sandwiches, composite laminates, monolithic composites, or the like.

Conventional composite laminates, such as carbon fiber in an epoxy matrix have relatively high flammability and heat release. Typically, when a composite component with a relatively low heat release is desired, phenolic resin is used in the composite component because it is inert. This has been the traditional material of choice to obtain low heat release. However, phenolic has relatively poor mechanical properties. The composite structures having at least the thermoplastic layer disclosed herein provide better mechanical properties without sacrificing heat release properties.

Thermoset resin-based composite laminate layers often do not make aesthetically pleasing surfaces. For example, thermoset resin layers may suffer from surface defects (e.g., pinhole imperfections), poor color uniformity, or other defects. Accordingly, composites with thermoset layers are normally painted or a sticker (e.g., vinyl) is applied to the surface to provide a selected appearance. However, such paint or stickers can scratch or flake off of the thermoset layer.

Thermoplastics tend to more readily provide selected surface finishes and also allow good color saturation and uniformity when a colorant is included therein. However, thermoplastics normally do not bond directly to thermosets. For example, the thermosets disclosed herein may include components, such as epoxy, that do not readily bond to thermoplastics such as a polyamide, polyethylene (e.g., LDPE or HDPE), polypropylene, polystyrene, polymethyl methacrylic acid (PMMA), etc. For structural components, it has not been desirable to include a thermoplastic therein because of the relatively low mechanical strength (e.g., rigidity, modulus of elasticity, etc.) of thermoplastics. Further, the relatively low melting point of most thermoplastics may make thermoplastics undesirable for some applications. However, the thermoset resins disclosed herein include a mixture containing polyurethane, which readily bonds to thermoplastics, making the composite laminate (e.g., sandwich or monolithic) structures containing thermoset layers bound to thermoplastic layers disclosed herein lightweight, strong, and able to have a surface finish that is tailored in one or more of color and texture.

The combination of thermoplastic layer and the thermoset layer may be used in a composite sandwich structure (e.g., composite laminate). The composite sandwiches disclosed herein include one or more thermoplastic layers. Such thermoplastic layers include a high-temperature thermoplastic polymer. In some examples, at least one thermoplastic layer may be disposed above a core, such as nearer an outermost surface of the composite sandwich than the core. In some examples, the composite sandwich may include at least one thermoset layer disposed below the thermoplastic layer, such as on one or both side of a core. In some examples, the composite sandwich may include an additional thermoplastic layer disposed near an innermost surface (e.g., substantially opposite the outermost surface) of the composite sandwich. Various embodiments are disclosed below.

FIG. 1 is an isometric view of a composite sandwich 100, according to an embodiment. The composite sandwich 100 may include at least one thermoplastic layer 110, a core 120, and at least one thermoset layer 130 and/or 140. The at least one thermoplastic layer 110 may be disposed on the at least one thermoset layer 130. The at least one thermoset layer 130 may be disposed on core 120. The core 120 may be disposed on the at least one thermoset layer 140. The layers of the composite sandwich 100 may further include additional layers (e.g., additional thermoplastic layers, additional cores, additional thermoset layers, aluminum layer, paint, or the like) or may omit any of the depicted layers in one or more embodiments.

As shown, the at least one thermoplastic layer 110 may be an outermost layer of the composite sandwich 100. Accordingly, the thermoplastic layer 110 may form a surface 112 of the composite sandwich 100, such as the outermost surface of a composite laminate structure. Accordingly, the thermoplastic layer 110 may provide a selected appearance to the outer surface of the composite laminate structure, such as a color or texture. The thermoplastic layer 110 may include a thermoplastic resin including one or more thermoplastic components. For example, the thermoplastic layer 110 may include one or more of polyetherimide (PEI), polyether ether ketone (PEEK), polytetrafluoroethylene (PTFE), perfluoroalkoxy (PFA), polyfluoroethylenepropylene (FEP), polyethylene terephthalate/polybutylene terephthalate (PET/PBT), other high temperature thermoplastics (e.g., thermoplastics with a melting point above 200° C.), or derivatives of any of the foregoing that have a melting point above 200° C. The thermoplastic may be provided in a liquid or solid form. For example, the thermoplastic may be a powder, crystals, grains, beads, pearls, sheets, sticks, a pre-impregnated fiber layer (e.g., pre-preg), etc., prior to being heated to a melting point. In some examples, the thermoplastic may be provided in liquid form, such as above a melting point of the thermoplastic or in a polymer solution or resin.

The thermoplastic layer 110 may include a plurality of fibers holding or carrying any of the thermoplastics disclosed herein or combinations thereof. In some examples, the plurality of fibers may be embedded in a polymer matrix (e.g., the thermoplastic resin). The plurality of fibers may include a fiber sheet, fiber mat, fiber fabric, fiber weave, a multi-ply fiber sheet, continuous fibers, aligned fibers, discontinuous fibers, etc. In some examples, oriented or aligned continuous fibers may have a higher performance than the discontinuous fibers and may be cosmetically more appealing than the discontinuous fibers, such as woven fibers, but at a higher cost. Thermoplastic layers including oriented continuous fibers may not stretch as much as thermoplastic layers including discontinuous fibers. The discontinuous fibers may be low cost recycled glass fibers, polymer fibers, or carbon fibers. For example, recycled carbon fibers that are waste from the resin transfer molding (RTM) or other sources may be used. For example, carbon fiber may be cut from dry NCF waste to a 35 mm fiber, and then formed into randomly oriented fiber sheet with an area density of at least about 200 g/m².

The fibers may include carbon fibers, glass fibers, or plastic fibers such as polyether ether ketone (PEEK), polyphenylene sulfide (PPS), or the like. In some examples, glass fibers may present an economical option for forming the thermoplastic layer than carbon fibers. Further, glass fibers may not deform (e.g., stretch or bend) as much as thermoplastic fibers when heated and pressed. For example, during a molding/curing process, plastic fibers in a composite laminate structure will stretch and bend far more than glass fibers.

In some examples, the plurality of fibers may include a glass fabric, polymer fabric, or carbon fiber fabric. The fabric may be a non-crimp fabric (NCF) or woven fabric. In some examples, the NCF may have a bi-axial configuration (e.g., fibers disposed at relative 0° and 90° angles). The bi-axial NCF has bi-directional strength and stiffness and flexible strength and stiffness. The NCF may provide greater pull out loads or tensile strength in highly loaded areas than the thermoplastic alone. The NCF may also reduce print-through from a composite core. The fiber fabric may have one or more layers of fibers therein.

In some examples, the plurality of fibers in the thermoplastic layer 110 may have a mass or weight of about 50 g/m² or more, 80 g/m² or more, 100 g/m² or more, such as about 150 g/m² to about 500 g/m², about 175 g/m² to about 350 g/m², about 200 g/m², about 220 g/m², about 300 g/m², or less than about 500 g/m². In some examples, the plurality of fibers in the thermoplastic layer 110 (or other selected layer(s)) may include an additional layer of fibers (e.g., a NCF with mass or weight of about 300 g/m²) to further strengthen the composite. The additional layer of fibers may be separate from the first layer or may be embedded in the same polymer matrix as the first layer of fibers.

The plurality of fibers may comprise at least 10 wt % of the thermoplastic layer 110, such as 10 wt % to 90 wt %, 20 wt % to 80 wt %, 30 wt % to 70 wt %, 40 wt % to 60 wt %, 10 wt % to 30 wt %, 30 wt % to 60 wt %, 60 wt % to 90 wt %, 33 wt % to 66 wt %, 63 wt % to 80 wt %, less than 90 wt %, less than 70 wt %, less than 50 wt %, or less than 30 wt % of the thermoplastic layer 110. The thermoplastic (resin) may comprise at least 10 wt % of the thermoplastic layer 110, such as 10 wt % to 90 wt %, 20 wt % to 80 wt %, 30 wt % to 70 wt %, 40 wt % to 60 wt %, 10 wt % to 30 wt %, 30 wt % to 60 wt %, 60 wt % to 90 wt %, less than 90 wt %, less than 70 wt %, less than 50 wt %, or less than 30 wt % of the thermoplastic layer 110. In some examples, it may be desirable to use less than 33 wt % thermoplastic in the thermoplastic layer 110, with the remainder comprising fibers such as glass fibers. In such examples, the heat release of a composite sandwich structure containing less than 33 wt % thermoplastic resin in the outer layer, may be very low (e.g., below 30 kW*Min./m²).

In some examples, the thermoplastic layer 110 may also include one or more additional materials such as a hardener, filler, colorant, etc. For example, the polymer resin (e.g., thermoplastic resin) of the thermoplastic layer 110 may include a colorant (e.g., pigment) to provide a selected color to the thermoplastic layer 110. In some examples, the thermoplastic layer 110 may contain only thermoplastic material(s), such as the thermoplastic resin.

The thermoplastic layer may have a thickness greater than about 0.01 mm, such as 0.01 mm to 5 mm, 0.1 mm to 1 mm, 0.05 mm to 0.5 mm. 0.05 mm to 0.3 mm, 0.3 mm to 0.6 mm, 0.6 mm to 1 mm, less than 5 mm, less than 2 mm, or less than 1 mm. In some examples, the thermoplastic layer 110 may not have a uniform thickness throughout the entire layer.

In some examples, the thermoplastic layer 110 may be provided as a pre-molded body. For example, PEI or has relatively high melting point and may be cured to form an intermediate or final shape prior to joining with one or more thermoset layers 130 or 140. In such examples, one or more of the pre-molded thermoplastic layer 110 or the one or more thermoset layers 130 or 140 (discussed below) may more readily fill the corners of a mold.

The thermoplastic layer 110 may be disposed on the thermoset layer 130. The thermoplastic layer 110 may be bound to the thermoset layer 130. For example, a component (e.g., polyurethane) in the polymer resin of thermoset layer 130 may bond to the thermoplastic (e.g., a PEI resin) of the thermoplastic layer 110. In some examples, the thermoplastic layer 110 may be abraded prior to bonding to provide a roughed surface for bonding to the as-yet uncured thermoset layer 130. In some example, the texture of the surface 112 may be selectively formed to provide a desired appearance, such as a smooth appearance, a roughened appearance, a leather appearance, or any other textured appearance.

The thermoset layer (e.g., thermoset resin-containing layer) 130 may include a thermoset resin disposed on a plurality of fibers. The thermoset layer 130 may include a polymer resin mixture of one or more thermosets having a relatively low viscosity and one or more thermosets having a relatively high viscosity. For example, the thermoset layer 130 may include a polymer (e.g., thermoset) resin including a polyurethane and an epoxy. The thermoset resin may have a relatively low viscosity (e.g., about 40 mPa·s or less) at room temperature. In some examples, explained in more detail below, the thermoset resin of the thermoset layer 130 may include one or more of at least one hardener, at least one Group VIII metal material, at least one filler material, or at least one thermoplastic. The relatively low viscosity of the thermoset resin may be mainly contributed by the low viscosity thermoset (e.g., a polyurethane, such as a polyurethane having about 150 centipoise viscosity at room temperature), because the thermoset resin component (e.g., epoxy) generally has a relatively higher viscosity than the low viscosity thermoset. The viscosity of the polyurethane may be about 30-40 mPa·s, and the viscosity of the epoxy may be about 50-70 mPa·s (or in a special case about 15 mPa·s). In some examples, the thermoset resin of the thermoset layer 130 may include one or more thermoplastic components (e.g., resins) therein, such as in a minor amount (e.g., less than 50 wt % or vol %), so long as the thermoset layer acts as a thermoset.

The thermoset (polymer) resin may include a liquid blend or mixture of epoxy and polyurethane. In some examples, the thermoset resin may include at most about 50% by volume of epoxy including a curing agent or hardener, up to about 20% by volume of a Group VIII metal material and the remaining volume may be polyurethane. When mixed, the epoxy may react (e.g., thermally and/or chemically) with the polyurethane. When the amount of epoxy exceeds a certain amount (e.g., about 40% by volume), an undesired reaction may occur, which may cause undesired heat and/or uncontrolled foaming. In some examples, the polymer resin (thermoset resin) of the thermoset layer may include less than about 50% by volume of epoxy, such as about 40% by volume of epoxy, about 5% to about 40%, about 10% to about 35%, about 20% to about 30%, about 20% to about 40%, about 25% to about 35%, about 28% to about 32%, about 20%, about 25%, about 35%, or about 30% volume of the polymer resin. In some examples, the thermoset resin may include less than about 30% by volume of epoxy. In some examples, the thermoset resin may include less than about 20% by volume of epoxy. In some examples, the thermoset resin may include less than about 10% by volume of epoxy. In some examples, the ratio of the polyurethane to the epoxy of the thermoset resin may be about 1:1 or more, such as about 2:1, about 2.5:1, about 3:1, about 3.5:1, about 4:1, about 5:1, about 7:1, or about 9:1. In some examples, the thermoset resin may include more than about 50% by volume of epoxy, with the remainder including polyurethane.

The polyurethane in the thermoset resin of the thermoset layer 130 may provide a bond to adjacent materials in the composite sandwich 100, such as to the thermoplastic of the thermoplastic layer 110. For example, polyurethane forms a strong bond to PEI. Accordingly, the polyurethane in the thermoset may form a strong bond to both the thermoplastic layer (e.g., skin) and a thermoplastic core (e.g., PEI tubes).

The thermoset resin may enable formation of polyurethane foams (e.g., micro-foams), which may enhance the bonding of the composite laminates to the core of the composite sandwich. In some examples herein, a selected amount of foaming may be desired in the thermoset resin of the thermoset such as by one or more components therein (e.g., the polyurethane reacting to form a micro-foam). As the polyurethane in the thermoset resin foams, the foam (e.g., micro-foam) may infiltrate into the cells or tubes of the core 120 thereby forming one or both of a chemical and mechanical bond with the core 120. Such infiltration may take place at the open ends of the core 120 and may include at least partial infiltration from the open ends inward. It was found that the composite skins (e.g., thermoset layers) of composite sandwich structures formed according the instant disclosure do not peel off the cores disclosed herein as easily as composite skins formed without the thermoset resins disclosed herein.

The thermoset resin, such as the mixture of polyurethane and epoxy, may be water resistant after curing due to the properties of one or more of the materials therein. Generally, a thermoset (e.g., polyurethane micro-foams) may have water permeation, while another thermoset (e.g., epoxy) may be water resistant. Therefore, the thermoset resin of the thermoset layer may be water resistant or sealed from water when the water resistant thermoset is used in sufficient quantity. For example, when the amount of epoxy in a polyurethane/epoxy thermoset resin is over about 28% by volume (e.g., 30% by volume), the thermoset layer may exhibit substantially water resistant character.

Epoxy generally has a shorter shelf life than polyurethane. In some examples, the epoxy may be mixed just a few hours before use. In contrast, polyurethane generally has a longer shelf life than epoxy, is based on isocyanate chemistry, and may have an adjustable shelf life and snap cure capabilities. In some examples, the polyurethane or the epoxy may include one or more fire retardant components. For example, the thermoset resin may include a phenolic epoxy or equivalents thereof.

In some examples, the thermoset resin may include at least one curing agent or hardener, the hardener may be configured to cause one or more components of the thermoset resin to cure. For example, when the thermoset resin includes epoxy and polyurethane, the thermoset resin may include a hardener for one or both of the epoxy or the polyurethane. In some examples, the at least one hardener may be specifically composed to cause only one component of the thermoset resin to cure. Suitable hardeners may include amine-based hardeners for epoxies, polyisocyanate containing hardeners for polyurethanes, or any other hardener suitable to cause one or more components of the thermoset resins disclosed herein to cure. For example, the at least one hardener may include amine-based hardeners for epoxies and polyisocyanate containing hardeners for polyurethanes. In an example, the at least one hardener may be present in a ratio of about 1:100 to about 1:1, about 1:100 to about 1:25, about 1:25 to about 1:5, about 1:10 to about 1:3, or about 1:5 to about 1:3 of the thermoset resin or component thereof (e.g., epoxy or polyurethane) by volume. For example, the epoxy may be about 10% to about 35% of the thermoset resin by volume, the at least one hardener may be present in a ratio of about 1:100 to about 1:3 of the thermoset resin or component thereof (e.g., a 1:5 ratio of hardener to resin or hardener to epoxy) by volume, and the polyurethane may make up at least some of the balance of the thermoset resin. The at least one hardener may be composed or used in an amount sufficient to cause the thermoset resin to cure (e.g., at least partially harden) in a desired time, such as about 3 hours or less, about 2 hours or less, about 1 hour or less, about 30 minutes or less, about 20 minutes or less, about 15 minutes or less, or about 10 minutes or less, depending on required time to apply the thermoset resin. The curing agent or hardener may be present in the thermoset resin in a ratio of about 1:100 to about 1:3 parts curing agent or hardener per part thermoset resin or component thereof. In some examples, the hardener may be composed to start curing at about 50° C. or more, such as about 50° C. to about 150° C., about 70° C. to about 120° C., or about 70° C. to about 90° C., or about 70° C. or more.

In some examples, the thermoset resin may also include a blend of one or more thermosets and a thermoplastic, such as a mixture of one or more of epoxy, polyurethane, and thermoplastic fibers. The thermoplastic may be included to provide a toughness or resiliency to the cured composite part. Suitable thermoplastics may include one or more of a polypropylene, a polycarbonate, polyethylene, polyphenylene sulfide, polyether ether ketone (PEEK) or another polyaryletherketone, or an acrylic. The thermoplastic may represent about 1% to about 20% of the thermoset resin by volume. For example, the epoxy may be about 10% to about 35% of the thermoset resin by volume, the thermoplastic may be about 1% to about 20% of the thermoset resin by volume, and the polyurethane may make up the balance of the thermoset resin. In some examples, the epoxy may be about 25% to about 35% of the thermoset resin by volume, the thermoplastic may be about 3% to about 15% of the thermoset resin by volume, and the polyurethane may make up the balance of the thermoset resin. While generally costly compared to glass fibers, thermoplastic fibers may be desirable where stretching of the thermoplastic materials embedded in the thermoset layer is desired during molding. Notably, glass and carbon fibers do not stretch during molding. In some examples, such resistance to stretching may be desired.

The volume percentage or ratio of epoxy sufficient to cause an undesired or uncontrolled reaction (e.g., uncontrolled foaming) between the epoxy and polyurethane may vary with the addition of a Group VIII metal material. Group VIII metal materials may serve to stabilize or mediate the reaction of the epoxy and polyurethane in the thermoset resin. The Group VIII metal material may include cobalt (Co), nickel (Ni), iron (Fe), ceramics (e.g., ferrites) including one or more of the same, or alloys including any of the same, among others. The Group VIII metal material may be equal to or less than 20% by volume of the thermoset resin, such as about 0.1% to about 20%, about 0.5% to about 10%, about 1% to about 5%, about 2%, about 3%, or about 4% or less of the volume of the thermoset resin. In some examples, the Group VIII metal material may be less than about 15% by volume of the thermoset resin, less than about 10% by volume, less than about 5% by volume, or less than about 1% by volume of the thermoset resin. By adding the Group VIII metal material to the thermoset resin, the amount of epoxy therein may be increased to provide the surface hardness as desired and/or to create a substantially watertight surface. For example, as the volume percentage of epoxy in the thermoset resin increases above about 25%, the cured composite may begin to exhibit watertight properties. If watertight properties are desired in the final product, the thermoset resin may include about 28% epoxy by volume or more, such as about 30% or more, about 30% to about 50%, about 32% to about 40%, or about 35% epoxy by volume. In order to reduce or substantially eliminate pin holes or micro-pores in the resulting composite material as the amount of epoxy in the thermoset resin increases, the Group VIII metal material may be added to reduce or control foaming. Although the Group VIII metal material may help stabilize the thermoset resin, the Group VIII metal material may add to the cost of the thermoset resin and composite component or increase the viscosity of the thermoset resin.

In some examples, one or more fillers may be added to the thermoset resin mixture to reduce shrinkage during curing. For example, if a very fast curing epoxy is selected, the fast curing epoxy may exhibit a higher shrinkage than slower curing epoxies, such as about 7% by volume. In some examples, utilizing one or more fillers in the thermoset resin may reduce such shrinkage in the same resin. Such fillers may include one or more of calcium carbonate, aluminum trihydroxide, alumina powders, silica powders, silicates, metal powders, or any relatively inert or insoluble (in the thermoset resin) salt. An excess of filler material may cause the cured composite to exhibit undesirable brittleness. Accordingly, close control of the amount of filler material in the thermoset resin is desirable. In some examples, the filler may be about 30% of the volume of the thermoset resin or less, such as about 1% to about 30%, about 2% to about 20%, about 5% to about 15%, about 10% to about 30%, about 1% to about 10%, more than zero percent to about 10%, about 1% to about 7%, about 3% to about 9%, less than about 10%, about 25%, more than 10% (e.g., 50% to 75%) of the volume of the thermoset resin. For example, the thermoset resin may include polyurethane, epoxy, and at least one filler material, where the epoxy is about 10% to about 35% of the polymer resin by volume, the at least one filler material is about 1% to about 30% of the polymer resin by volume, and the polyurethane makes up at least a portion of the balance of the thermoset resin. In some examples, the epoxy may be about 25% to about 35% of the thermoset resin by volume, the at least one filler material may be about 1% to about 10% or about 3% to about 20% of the thermoset resin by volume, and the polyurethane may make up at least a portion of the balance of the thermoset resin. As the resin cures, the filler material does not shrink like the thermoset resin. Thus, the volume of thermoset resin displaced by the filler material provides a stable volume in the resulting composite material thereby reducing the overall shrinkage of the composite material. Such fillers may allow faster curing times while reducing shrinkage, which typically occurs during fast cures. For example, the curing time of a thermoset resin disclosed herein may be reduced to about 6 minutes or less, such as about 3 minutes or less, about 90 seconds or less, about 60 seconds, or about 40 seconds, while maintaining shrinkage of less than 3% by volume. Although the filler may help reduce or eliminate shrinkage, the filler may add to the cost of the thermoset resin and composite component or increase the viscosity of the thermoset resin. In some examples, a combination of one or more of the epoxy, polyurethane, thermoplastic, Group VIII metal material, or filler material may be configured to provide a net shrinkage of less than about 3% by volume and/or still exhibit a low enough viscosity to be sprayed from a spray tip at relatively low pressure.

A polyurethane-containing thermoset may provide one or more of a desired resistance to bending, resiliency, low viscosity, ability to bond to various materials, or a foaming capability (e.g., ability to form micro-foams during formation of composite laminate structures) to the thermoset resin. An epoxy-containing thermoset may provide a desired energy absorption or mechanical failure profile to the thermoset resin, such as brittle breakage along a force vector parallel to the surface of the part. The epoxy-containing thermoset may provide a water resistant (e.g., water tight) character to the resulting composite laminate or a better load transfer capability (e.g., a harder surface) than a high polyurethane content or polyurethane alone.

The thermoset layers (e.g., thermoset resins therein) disclosed herein may have relatively short cure times while exhibiting relatively little shrinkage (e.g., below about 3%). The epoxy therein may have a curing time of 5 minutes at 120° C., and a glass transition temperature ("Tg") of about 120° C., whereas the curing time of the polyurethane may be about 1 hour or more and a Tg below about 250° C. As used herein, the term "cure" or "cured" includes the meanings at least partially or fully cure or cured.

The thermoset resin of the thermoset layer may have a better load transfer capability and improved mechanical performance, including higher stiffness, strength, modulus and hardness among others than resins having only polyurethane or only epoxy. The thermoset resin may also have a low shrinkage by volume from the uncured liquid state to the cured solid state of equal to or less than 3% during curing, such as about 1.5% to about 3%, about 2% to about 3%, about 2.5% to about 3%, or about 2.5%. The low shrinkage allows better dimensional control of finished composite components.

The thermoset layer 130 may include a plurality of fibers, such as any of the plurality of fibers or forms thereof disclosed herein. For example, the plurality of fibers in the thermoset layer 130 may be similar or identical to any of the plurality of fibers disclosed above for the thermoplastic layer 110, in one or more aspects. For example, the plurality of fibers in at least one thermoset layer 130 and the plurality of fibers in the thermoplastic layer 110 may include glass fibers, such as fiber sheets. In some examples, the plurality of fibers in the thermoset layer 130 may differ from the plurality of fibers in the thermoplastic layer 110, in one or more aspects. For example, the plurality of fibers in at least one thermoset layer 130 may include carbon fibers and the plurality of fibers in the thermoplastic layer 110 may include glass fibers. The plurality of fibers in at least one thermoset layer 130 may a different density and the plurality of fibers in the thermoplastic layer 110, such as a 220 gsm fiber sheet and an 80 gsm fiber sheet, respectively.

The plurality of fibers may comprise at least 10 wt % of the thermoset layer 130, such as 10 wt % to 90 wt %, 20 wt % to 80 wt %, 30 wt % to 70 wt %, 40 wt % to 60 wt %, 10 wt % to 30 wt %, 30 wt % to 60 wt %, 60 wt % to 90 wt %, 33 wt % to 66 wt %, 63 wt % to 80 wt %, less than 90 wt %, less than 70 wt %, less than 50 wt %, or less than 30 wt % of the thermoset layer 130. The thermoset (resin) may comprise at least 10 wt % of the thermoset layer 130, such as 10 wt % to 90 wt %, 20 wt % to 80 wt %, 30 wt % to 70 wt %, 40 wt % to 60 wt %, 10 wt % to 30 wt %, 30 wt % to 60 wt %, 60 wt % to 90 wt %, less than 90 wt %, less than 70 wt %, less than 50 wt %, or less than 30 wt % of the thermoset layer 130.

The thermoset layer 130 may have a thickness greater than about 0.01 mm, such as 0.01 mm to 1 cm, 0.1 mm to 5 mm, 0.05 mm to 0.5 mm. 0.05 mm to 0.3 mm, 0.3 mm to 0.6 mm, 0.6 mm to 1 mm, 1 mm to 3 mm, 2 mm to 5 mm, less than 1 cm, less than 5 mm, less than 2 mm, or less than 1 mm. In some examples, the thickness of the thermoplastic layer 110 and the thermoset layer 130 may be identical. In some examples, the thermoset layer(s) 130 (and/or 140) may have a thickness that is at least 2 times the thickness of the thermoplastic layer 110, such as at least 3 times, at least 5 times, or at least 10 times the thickness of the thermoset layer 130. In some examples, the thermoset layer(s) 130 (and/or 140) may not have a uniform thickness throughout the entire layer(s).

The at least one thermoset layer 130 may be disposed, either directly or indirectly, on the core 120, or vice versa. The core 120 may include one or more of a "soft" core or a "hard" core material. The "hard" core may effectively transfer the load from one end (e.g., side) of the core to the other end of the core. For example, the "hard" core may be formed from a core blank that includes one or more plastic materials and may include a plurality of cells, such as cells having open ends (e.g., closely-packed substantially parallel plastic tubes). The plurality of cells may be at least partially defined by corresponding one or more cell walls (e.g., the plastic material may define a honeycomb-like structure, where the cells may have any number of suitable shapes). In some examples, the compressible cells of the core blank may be formed or defined by tubes or straws. In some examples, the cells may be tubes, such as drinking straws (e.g., each straw may define a corresponding cell of the core and adjacent cores may define additional cells in the gaps or spaces therebetween). The cells may be formed from polycarbonate, polyethylene, polypropylene, polyphenylene sulfide (PPS), polyether ether ketone (PEEK), PEI, or other thermoplastics. Thermoplastic straws may be commercially made of polycarbonate at very low cost and may be secured together in a generally parallel arrangement. The use of polycarbonate, polyethylene, polypropylene, polyether ether ketone (PEEK), PEI, or other plastics in the core 120 may provide a greater resistance to tearing upon application of tension to the core 120 than is found in cardboard or paper board core materials. In some examples, a honeycomb-like structure may be provided by a plurality of non-cylindrical cells form from non-cylindrical tubes. In some examples, the core 120 may include a unitary structure including a plurality of co-extruded thermoplastic tubes sharing common walls. The core 120 may include more than one type or shape of cell in the plurality of cells. The core 120 (e.g., a bundle of PEI plastic tubes) of the composite sandwich may be suitable for fabricating auto components, such as a chassis or dashboard; seat components, such as a seat back; structural components, such as a bulkhead or overhead bins; etc.

The hard core may alternatively or additionally include a foam, such as a closed cell foam. The foam may be a high density foam or a low density foam. The foam may be a foam body, such as a block, sheet, or other body of foam. The foam may be made from any of the thermosets or thermoplastics disclosed herein. In some examples, the foam may include a polyurethane, polycarbonate, polymethacrylimide (PMI), or other polymer-based foam such as any thermoset or thermoplastic resin. The foam of the foam body may be an open cell foam or a closed cell foam. The foam of the foam body may be a free rise foam. In some examples, an $sp^2$ carbon-containing material, such as graphene (e.g., graphene sheets, flakes, springs, or the like), carbon nanotubes (e.g., single or multiwall carbon nanotubes), or fullerenes, may be disposed in the material of the foam core. For example, graphene flakes or another $sp^2$ carbon-containing material may be incorporated in the polymer material of the foam core. In such examples, the amount of $sp^2$ carbon-containing material in the foam core may be less than about 30 weight % of the foam core, such as 1 wt % to 30 wt %, 1 wt % to 10 wt %, 5 wt % to 15 wt %, 10 wt % to 20 wt %, 20 wt % to 30 wt %, or less than 20 wt % of the foam core. In examples utilizing foam cores, the thermoset resin (e.g., micro-foam formed therefrom) may bond the foam core to the additional thermoset layer 130, such as via the polyurethane or the infiltration into cells of the foam. In some examples, the foam (e.g., foam body) may be present as a separate layer adjacent to the plurality of cells. In some examples, the foam may be present at least partially within at least some the plurality of cells, such as by compression into the plurality of cells. The hard core can provide a high bending stiffness for the composite sandwich. The "hard" core may increase the bending stiffness of the composite sandwich more than the "soft" core.

The "hard" core, such as that formed of open ended plastic cells, such as tubes or drinking straws, may be difficult to attach to the composite laminate (e.g., one or more thermoset and/or thermoplastic layers over the core) using a conventional epoxy. For example, the composite laminate may be more likely to peel off the "hard" core when a conventional epoxy is used. The thermoset resins according to examples disclosed herein resolve the peeling problem for the composite sandwich that includes a "hard" core by providing sufficient adhesion thereto (e.g., by greater adhesion with micro-foams formed by the polyurethane/epoxy blend which may at least partially extend into the cells via the open ends). In some examples, the open ends of the cells may be at least partially deformed during manufacture of a composite sandwich structure, such as via one or more of compression, melting, or the like. Such deformation may help adhere the thermoset resin in layers adjacent to the core 120 to the core 120.

In contrast to a "hard" core, a "soft" core may not transfer the load from one end of the core to the opposite end of the core when a load is applied onto one end of the core, for example, the "soft" core may be formed from paperboards, or cardboards, or low density foams, and the like. The "soft" core may absorb more energy or impact vertically than the "hard" core (e.g., in a direction substantially perpendicular to the composite laminates) assuming the impact is along a Z axis (e.g., generally perpendicular to the surface 112 of the composite sandwich 100). The "hard" core may absorb more energy horizontally, such as along the plane of the composite laminates (e.g., in an X-Y plane) which is perpendicular to the Z axis. The composite sandwich (not shown), including paperboards, may be used for car hoods, automotive surface panels (e.g., A-class surface panels having minimal pinholes or porosity therein), aerospace applications, consumer products (e.g., furniture), or construction materials or similar applications where energy absorption is desired. The manufacturing process may be different for the "soft" core composite sandwich from the "hard" core composite sandwich, because the "soft" core does not transfer a load having a vector substantially perpendicular to the core as well as the "hard" core does.

In some examples (not shown), the core 120 may include both soft and hard core materials, such as in adjacent layers of a core 120 (e.g., dual core). For example, a composite sandwich may include a plurality of cells and a paperboard running parallel thereto. In such examples, the paperboard may provide sound dampening and the hard core may absorb more energy than the paperboard. In some examples, the "hard" and "soft" core materials may be disposed in different layers of a composite sandwich.

In some examples, the core 120 may have a density of about 20 kg/m³ or more such as about 20 kg/m³ to about 150 kg/m³, about 40 kg/m³ to about 100 kg/m³, about 60 kg/m³ to about 80 kg/m³, or about 65 kg/m³ to about 75 kg/m³. The core 120 may have an initial cell height of about 100 μm to about 10 cm, about 1 mm to about 5 cm, about 5 mm to about 3 cm, about 250 μm to about 1 cm, about 1 cm to about 5 cm, about 1 mm to about 5 mm, about 5 mm to about 1 cm, about 7 mm, or about 1 cm. In some examples, the core 120 may have a density of about 70 kg/m³ and a cell height of about 7 mm. The core 120 may include a plurality of integrally formed tubes (e.g., a plurality of open-ended structures bound together), which may collectively bend or otherwise distort in one or more regions upon application of, tension, heat, and/or pressure in a mold, whereas cardboard may tear under the same conditions. In some examples, the core 120 may bend, compress, or stretch in one or more regions therein, depending on the geometry of the mold and desired finished dimension of a part including the same. The cells or tubes may be bonded together such as by integral formation (e.g., extruded or molded together), an adhesive, thermal bonding (e.g., melting) such as being bonded together after being individually extruded, or any other suitable attachment means. The cells or tubes may be composed to at least partially soften or melt upon application of a specific amount of heat. For example, the cells or tubes may be composed to soften or melt and at least partially compress, while in a mold such that the resulting composite sandwich may at least partially comply with the shape of a mold. The length of each of the tubes prior to compression may be selected to provide a desired amount of compliance upon application of heat and/or pressure thereto. For example, the length or height of compressed or uncompressed tubes may be about 100 μm to about 10 cm, about 1 mm to about 5 cm, about 5 mm to about 3 cm, about 250 μm to about 1 cm, about 1 cm to about 5 cm, about 1 mm to about 5 mm, about 5 mm to about 1 cm, about 7 mm, or about 1 cm. The tubes may exhibit a substantially similar height and/or diameter. For example, the tubes may exhibit a diameter of about 1 mm or more, such as about 1 mm to about 5 cm, about 3 mm to about 3 cm, about 5 mm, to about 1 cm, about 6 mm, less than about 2 cm, or less than about 1 cm. While the cells (e.g., tubes) depicted herein have a circular cross-sectional shape, the cells may exhibit substantially polygonal cross-sectional shapes (e.g., triangular, rectangular, pentagonal, etc.), elliptical cross-sectional shapes, or amorphous shapes (e.g., having no set pattern or being a combination of circular and polygonal), when viewed along the longitudinal axis thereof. The cells may be defined by a single integral structure with common walls between adjacent cells or tubes. While the term "cells" or "tubes" is used herein, in some examples the cells or tubes may include on one or more closed ends; or exhibit configurations other than tubular (e.g., circular), such as polygonal (e.g., a plurality of closed or open pentagonal cells), or configurations not having connected sides therebetween (e.g., baffles).

In some examples, the core 120 may be fully compressed to form a solid or may be partially compressed to reduce the core height. The compressed core height may be about 15% or more of the initial core height, such as about 15% to about 90%, about 25% to about 75%, about 40% to about 60%, about 15% to about 50%, or about 15% of the initial core height. It will be appreciated that the number of layers may vary above and below the core 120 of the composite sandwich, such as having different layers or materials therein. The dimension and density of the core 120 may vary, such as having more cells (e.g., tubes) in one or more regions thereof, having larger or smaller diameter cells in one or more regions thereof than in adjacent regions, having one or more regions including tubes having different (e.g., smaller or larger) wall thicknesses than tubes in adjacent regions, or combinations of any of the foregoing. The weight of the fiber sheet or NCF may vary in one or more regions of the composite sandwich.

The at least one (second) thermoset layer 140 may be similar or identical to the (first) thermoset layer 130 in one or more aspects. The at least one thermoset layer 140 may include a thermoset resin such as any of the thermoset resins disclosed herein. The at least one thermoset layer 140 may include a plurality of fibers identical to or different from the fibers in one or more of the thermoplastic layer 110 and/or the at least one thermoset layer 130 (e.g., first thermoset layer). For example, the thermoplastic layer 110 may include glass fibers, the at least one thermoset layer 130 may include glass or carbon fibers, and the at least one thermoset layer 140 may include glass or carbon fibers. In some examples, the thermoplastic layer 110 may include PEI embedded in glass fibers, the at least one thermoset layer 130 may include a plurality of glass fibers embedded in an epoxy-polyurethane resin, and the at least one thermoset layer 140 may include a plurality of carbon fibers embedded in an epoxy-polyurethane resin. At least one thermoset layer 140 (e.g., second thermoset layer) may be disposed below the core 120, such as bonded thereto. One or more of a thermoset composition (e.g., thermoset resin), amount of thermoset composition in the layer, layer thickness, fiber type, fiber weight, lateral dimensions, etc., of the thermoset layer 140 may differ from the same aspects of the thermoset layer 130.

In some examples, one or more thermoset layers, one or more thermoplastic layers, and core 120 materials may be disposed in a laminate composite structure. In such examples, the thermoplastic layer 110 may be directly bonded to a thermoset layer 130. Thermoset layer 130 bonded directly to the thermoplastic layer 110, may be in a coplanar or parallel orientation to the thermoplastic layer 110. In some examples, the lateral dimensions of the thermoplastic layer 110 may be coextensive with the thermoset layer 130. In some examples, the lateral dimensions of thermoset layer 130 or 140 may be larger than—extend past the largest extent of—the thermoplastic layer 110. In any of the examples disclosed herein, one or more of the thermoset layers 130 and 140 may be substituted with one or more thermoplastic layers.

In some examples, one or more optional additional layers may be disposed between any of the components of the composite sandwich 100. For example, a metal layer, such as an aluminum foil or mesh may be disposed between the thermoplastic layer 110 and the at least one thermoset layer 130. In such examples, the metal layer may be at least about 0.01 mm thick, such as at least about 0.1 mm thick (e.g., about 0.2 mm). While the metal layer may be used, the metal layer is not necessary to achieve satisfactory heat release characteristics where a thermoset and thermoplastic outer bi-layer is used as shown in FIG. 1. For example, the heat release characteristics of a thermoplastic layer disposed over a thermoset layer may be well within safety standards for heat release in automotive, aircraft, marine, rail, etc., applications (e.g., less than 65 kW*min/m$^2$, less than 60 kW*min/m$^2$, less than 40 kW*min/m$^2$, or less than 30 kW*min/m$^2$).

In some examples, a soft core material (e.g., cardboard) may be disposed between the core 120 and the at least one thermoset layer 130 and/or 140. In some examples, the composite sandwich 100 may include an additional thermoplastic layer, such as a thermoplastic layer disposed below the at least one thermoset layer 140. The additional thermoplastic layer may be similar or identical to any of the thermoplastic layers disclosed herein. In some examples, the first thermoplastic layer 110 may be different from the second thermoplastic layer (not shown), in one or more aspects.

In some examples, it may be desirable to utilize a relatively low amount of thermoplastic resin in the thermoplastic layer, such as less than 40 wt % (e.g., less than 33 wt %) thermoplastic resin in the thermoplastic layer, where the resin is disposed in/on glass fibers. In such examples, it was unexpectedly found that heat release of a composite sandwich containing the thermoplastic layer was below 30 kW*min/m$^2$, where it was expected to be at least 40 kW*min/m$^2$. For example, a composite sandwich with a PEI embedded glass fiber thermoplastic layer was expected to have a heat release (e.g., peak heat release) of at least 40 kW*min/m$^2$ as a PEI core had a heat release above 40 kW*min/m$^2$. However, the composite sandwich exhibited an average heat release of about 24 kW*min/m$^2$ and an average peak heat release of 26.7 kW*min/m$^2$. Thus, it is expected that composite sandwiches without an aluminum layer may provide satisfactory heat release characteristics for use in automotive, aircraft, rail, marine, and other applications. Additionally, by removing the aluminum layer, a relatively smooth thermoplastic layer surface may be achieved upon curing, as compared to a composite sandwich with an aluminum layer below the thermoplastic layer which tends to have pinholes and bubbling in the thermoplastic layer during similar curing procedures (e.g., heat pressing). The composite sandwich structures disclosed herein may have a heat release of 40 kW*min/m$^2$, such as of 30 kW*min/m$^2$ or less, 25 kW*min/m$^2$ to 35 kW*min/m$^2$, or 20 kW*min/m$^2$ to 40 kW*min/m$^2$.

The combination of a thermoplastic layer 110 disposed on a thermoset layer 130 may be used as an outer surface of a structure. For example, the combination of a thermoplastic layer 110 disposed on a thermoset layer 130 may be used as an outer surface of a seatback, dashboard, luggage, storage bin, luggage bin, bulkhead, molding, trim, arms, or other portions of vehicles, aircraft, boats, railcars, etc. In such examples, the thermoplastic layer 110 may add a selected aesthetic appearance, such as a color and/or defect free appearance. By having a thermoplastic layer 110 with a colorant therein, the thermoplastic layer 110 may maintain a selected color/appearance despite scratches, whereas a painted surface may appear scratched due to the absence of paint from similar scratches. Additionally, by including the thermoset layer 130, the combination of the thermoplastic layer 110 and thermoset layer 130 may provide a greater structural rigidity and strength than a single thermoplastic layer 110 alone. Accordingly, the thermoplastic layer 110 bound directly or even indirectly to a single thermoset layer 130 which is bound to a core may provide both aesthetic and structural advantages over conventional composite laminates.

Figure 2:
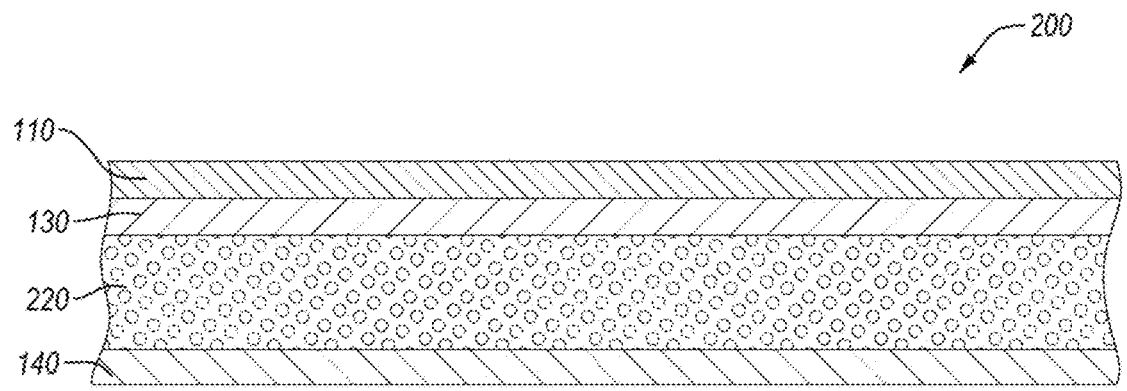
FIG. 2 is a side cross-sectional view of a composite sandwich, according to an embodiment.

Further configurations of composite sandwiches are may be utilized. In some examples, a composite sandwich 200 may include a foam core. FIG. 2 is a side cross-sectional view of a composite sandwich 200, according to an embodiment. The composite sandwich 200 may include the thermoplastic layer 110 disposed on the thermoset layer 130. The thermoset layer 130 may be disposed on a foam core 220. The foam core 220 may be disposed on the thermoset layer 140. The foam core 220 may be similar or identical to any of foam cores disclosed herein, in one or more aspects. For example, the foam core 220 may include a polymethacrylimide (PMI)-based foam core. Examples having a polymethacrylimide (PMI)-based foam core and an outermost thermoset layer have shown lower heat release values than examples having polycarbonate tubes or the like.

Figure 3:
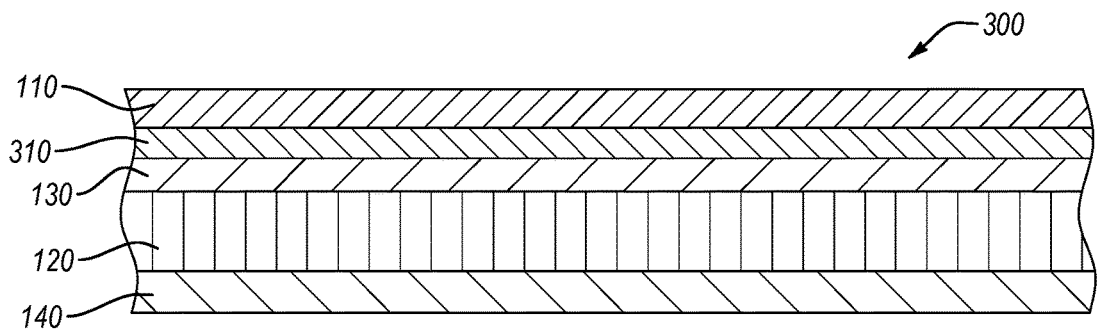
FIG. 3 is a side cross-sectional view of a composite sandwich, according to an embodiment.

In some examples, a composite sandwich may have at least two thermoplastic layers, such as the two outermost layers or the outermost and innermost layers of the composite sandwich. FIG. 3 is a side cross-sectional view of a composite sandwich 300, according to an embodiment. The composite sandwich 300 includes the thermoplastic layer 110 disposed on an additional thermoplastic layer 310. The additional thermoplastic layer 310 is disposed on the thermoset layer 130. The thermoset layer 130 may be disposed on the core 120. The core 120 may be disposed on the thermoset layer 140. The thermoset layer 140 may be disposed on the thermoplastic layer 310. The thermoplastic layer 310 may be similar or identical to the thermoplastic layer 110 disclosed herein, in one or more aspects. For example, the thermoplastic layer 310 may include a PEI resin. In some examples, the thermoplastic layer 310 may include a plurality of fibers therein, such as glass or high-temperature thermoplastic fibers. For example, the thermoplastic layer 310 may include a high-temperature thermoplastic resin disposed on a fiber sheet (e.g., an 80 gsm glass fiber fabric).

In examples having multiple thermoplastic layers (e.g., high-temperature thermoplastic resin layer) on the outermost surface, the composite sandwich may provide relatively low heat release characteristics with a selected aesthetic appearance without sacrificing mechanical strength. Further layers may be included in the composite sandwich 300, such as additional cores, thermoset layers, aluminum layers, paint, vinyl, or the like on top of, between, or below any of the depicted layers.

Figure 4:
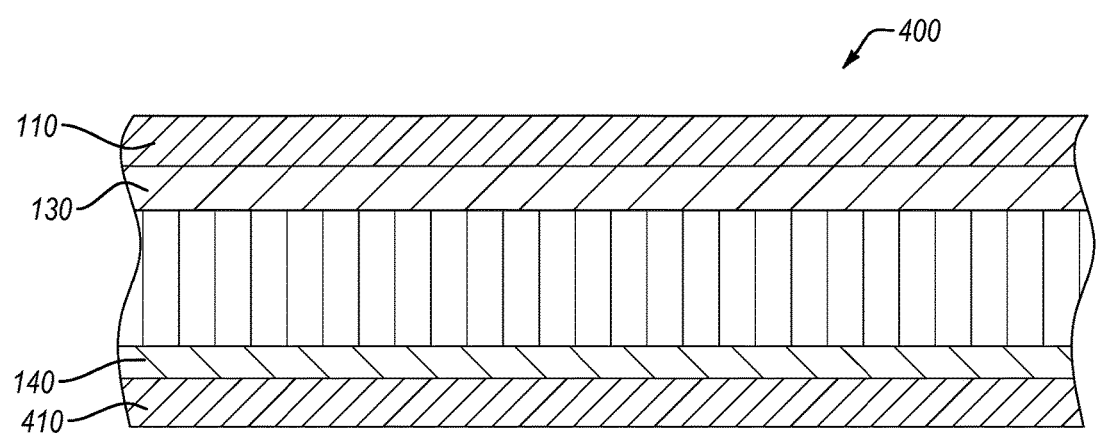
FIG. 4 is a side cross-sectional view of a composite sandwich, according to an embodiment.

FIG. 4 is a side cross-sectional view of a composite sandwich 400, according to an embodiment. The composite sandwich 400 includes the thermoplastic layer 110 disposed on the thermoset layer 130. The thermoset layer 130 may be disposed on the core 120. The core 120 may be disposed on the thermoset layer 140. The thermoset layer 140 may be disposed on the thermoplastic layer 410. The thermoplastic layer 410 may be similar or identical to the thermoplastic layer 110 disclosed herein, in one or more aspects. For example, the thermoplastic layer may include a PEI resin. In some examples, the thermoplastic layer 410 may include a plurality of fibers therein, such as glass or high-temperature thermoplastic fibers.

In examples having a thermoplastic layer (e.g., high-temperature thermoplastic resin layer) on both the outermost and innermost surfaces, the composite sandwich may provide relatively low heat release characteristics from both surfaces with a selected aesthetic appearance without sacrificing mechanical strength. Such examples may be useful in structures as dividers where either one or both sides of the divider may be directly exposed to a heat source and/or visible. Further layers may be included in the composite sandwich 400, such as additional cores, thermoset layers, aluminum layers, paint, vinyl, or the like on top of, between, or below any of the depicted layers.

Any of layers in the composite sandwiches 100, 200, 300, or 400 may be omitted therefrom or may be used in combination with any of the other composite sandwiches 100, 200, 300, or 400.

The combination of a (high-temperature) thermoplastic layer disposed on a thermoset layer may be used as an outer surface of a laminate composite structure. For example, the combination of a thermoplastic layer disposed on a thermoset layer may be used as an outer surface of a seatback, dashboard, luggage, storage bin, luggage bin, bulkhead, molding, trim, arms, or other portions of vehicles, aircraft, boats, railcars, etc. In such examples, the thermoplastic layer of the composite sandwich may provide a selected heat release to the component. Additionally, by including the additional thermoset layer(s) and the core, the combination in the composite sandwiches herein may provide a greater structural rigidity and strength than a single thermoset layer with the thermoplastic layer. By including the high-temperature thermoplastic layer (e.g., PEI layer) as the outermost layer, heat release properties of composite sandwich structure are improved over similarly dimensioned thermoset layers that are painted, all while providing a surface that does not readily show discoloration when scratched. The composite sandwiches and structures formed therefrom disclosed herein may have a heat release of 70 kW*min/m$^2$ or less, such as 1 kW*min/m$^2$ to 35 kW*min/m$^2$, 20 kW*min/m$^2$ to 40 kW*min/m$^2$, 25 kW*min/m$^2$ to 50 kW*min/m$^2$, 40 kW*min/m$^2$ to 60 kW*min/m$^2$, 65 kW*min/m$^2$ or less, 60 kW*min/m$^2$ or less, 50 kW*min/m$^2$ or less, 40 kW*min/m$^2$ or less, 35 kW*min/m$^2$ or less, 30 kW*min/m$^2$ or less, 25 kW*min/m$^2$ or less, 20 kW*min/m$^2$ or less.

In some examples, a composite sandwich structure may include at least two cores. In such examples, a thermoset layer having carbon fibers therein may have a core disposed on both sides thereof. In such examples, one or more thermoset layers and/or thermoplastic layers may be disposed on the cores. For example, the composite sandwich may include at least thermoplastic layer, a first core there beneath, a thermoset layer beneath the first core, a second core beneath the thermoset layer, and an additional thermoplastic layer beneath the second core. In some examples, the composite sandwich may include an additional thermoset layer between first core and the thermoplastic layer or between the second thermoplastic layer and the second core.

It is desirable to produce light weight, strong, and stiff composites with relatively low heat release values (e.g., below 60 kW*min/m$^2$, below 40 kW*min/m$^2$, or below 30 kW*min/m$^2$) for fabricating a structural component, such as a chassis; panels for communication equipment; frames, body parts, or interior components for transportation or vehicles (e.g., bicycles, motor cycles, cars, trucks, airplanes, railway vehicles and equipment, boats, etc.); agricultural applications (e.g., agricultural equipment), energy related applications (e.g., wind power, solar); satellite applications; aerospace applications (e.g., portions of a structure or an interior component of an aircraft such as a seat component or overhead bin); construction materials (e.g., building materials and the like); and consumer products (e.g., furniture, toilet seats, and electronic products among others). It is desirable to produce light weight, strong composite components with good energy absorption and heat release values where high bending stiffness, low weight, and low heat release are desired. The components may be designed to provide energy absorption, such as during a car accident, while providing a selected aesthetic appearance (e.g., texture, color, etc.). For safety reasons, the components may be designed to have some damping or energy absorption characteristics. The laminate composite structures and components disclosed herein are designed to meet safety standards or regulatory requirements such as energy absorption, stiffness, or heat release values in various fields of use, such as aviation, marine, rail, or automotive, all while providing a selected aesthetic appearance on an outer surface thereof. The components disclosed herein may include a composite sandwich structure having a selected aesthetic appearance, high bending stiffness, and low heat release as disclosed herein.

In some examples, monolithic components can be formed using at least the high-temperature thermoplastic layer(s) disclosed herein. In some examples, monolithic components can be formed from a pre-preg of at least a plurality of fibers containing the thermoplastic polymer resin or by a wet lay-up process.

Figure 5:
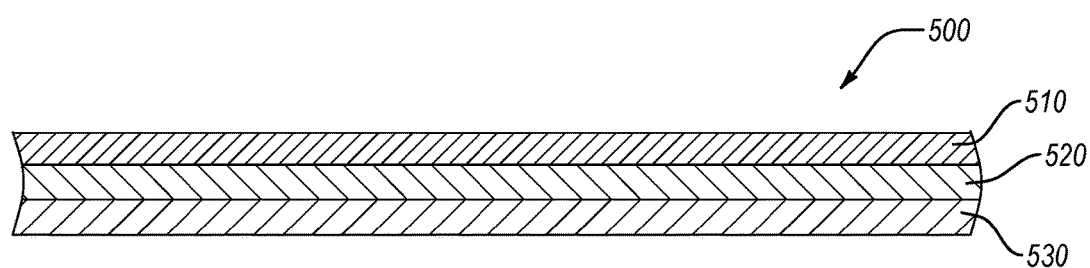
FIG. 5 is a side cross-sectional view of a monolithic composite, according to an embodiment.

FIG. 5 is a cross-sectional view of a monolithic composite 500, according to an embodiment. The monolithic composite 500 may be a multilayer monolithic composite as shown or a single layer monolithic composite. The monolithic composite 500 includes one or more layers having a plurality of fibers disposed in a polymer resin wherein the monolithic composite or an outermost layer thereof exhibits heat release below 60 kW*min/m$^2$. For example, the monolithic composite 500 includes the first layer 510, the second layer 520, and the third layer 530. As depicted, the first layer 510 may be an outermost layer, followed by the second layer 520 and the third layer 530. In some examples, monolithic composites may include more or fewer layers than those depicted in FIG. 5. In examples where the monolithic composite includes multiple layers, no core is present between the layers. For example, only sheets of fibers having resin therein or thereon may be present in the monolithic composite 500.

One or more of the first layer 510, the second layer 520, or the third layer 530 may be similar or identical to the thermoplastic layer 110 in one or more aspects. For example, the first layer 510 may be a thermoplastic layer having a (high-temperature) thermoplastic resin disposed on a plurality of fibers. One or more of the second layer 520 or third layer 530 may be thermoplastic layers having thermoplastic resin therein. The thermoplastic resin may include any of the thermoplastic resins disclosed herein. The plurality of fibers may include any of the pluralities of fibers disclosed herein. The first layer 510 is an outermost layer in some examples. In some examples, the third layer is a thermoplastic layer having a high-temperature thermoplastic resin disposed on a plurality of fibers. In such examples, both surfaces of the monolithic composite 500 may have lower heat release characteristics than thermoset layers in the same positions. In some examples, the second layer 520 may be a thermoplastic layer having a high-temperature thermoplastic resin disposed on a plurality of fibers. In some examples, the pluralities of fibers and thermoplastic resin in one or more of the first layer 510, the second layer 520, or the third layer 530 may similar or identical to those in the adjacent layer(s).

One or more of the first layer 510, the second layer 520, or the third layer 530 may be similar or identical to the thermoset layer 130 or the thermoset layer 140 in one or more aspects. In such examples, the first layer 510 may be a thermoplastic layer as disclosed herein and one or more of the second layer 520 or the third layer 530 may be a thermoset layer. In such examples, the pluralities of fibers in the layers may be similar or identical to each other in one or more aspects (e.g., fiber composition, fiber body type or form, thickness of fiber body density of fiber body, etc.). Alternatively, the pluralities of fibers in the layers may differ from each other in any of the one or more aspects.

In some examples, one or more of the first layer 510, the second layer 520, or the third layer 530 may differ from the adjacent layers in one or more of polymer resin composition, fiber type or area density, thickness, or any other characteristic. For example, the first layer 510 may include glass fibers, the second layer 520 may include carbon fibers, and the third layer 530 may include carbon or glass fibers. In such examples, the polymer resin in each layer may be identical or differ from the adjacent layers in one or more of composition or amount.

In some examples, one or more of the second layer 520 or the third layer 530 may be omitted, such as to form a dual layer or single layer monolithic composite.

In some examples, the first layer 510 includes a thermoplastic resin disposed on a plurality of first plurality of glass, carbon, or thermoplastic fibers, the second layer 520 includes the thermoplastic resin disposed on a second plurality of glass, carbon, or thermoplastic fibers, and the third layer 530 includes the thermoplastic resin disposed on a third plurality of glass, carbon, or thermoplastic fibers. In such examples, the pluralities of fibers may be similar or identical in each layer, such as being of the same material type. In such examples, the polymer resin may in the layers may be independently a thermoset resin, a thermoplastic resin, or a blend thereof. By providing the first layer 510 with a thermoplastic resin as disclosed herein, the underlying second layer 520 and third layer 530 may be "shielded" from heat by the high temperature thermoplastic polymer. For example, monolithic composite 500 or at least the first layer 510 may have a heat release below 60 kW*min/m², such as any of the values for heat release disclosed herein. Additionally, by providing one or more thermoset layers reinforced by a plurality of fiber, without a core, the monolithic composite 500 may provide mechanical strength, improved heat release, and a thinner cross-sectional profile compared to composite sandwiches and monolithic composites made without a high-temperature thermoplastic layer.

The composite sandwich structures or monolithic composites disclosed herein may be disposed in or used to form parts. Examples of such composite sandwich or monolithic components may include panels (e.g., vehicle body panels such as car hoods, vehicle interior panels such as interior bulkheads, dashboards, moldings, electrical panels, etc.), seat components, tables, trays, storage bins (e.g., overhead storage) or other storage container panels, or any other components disclosed herein.

Figure 6:
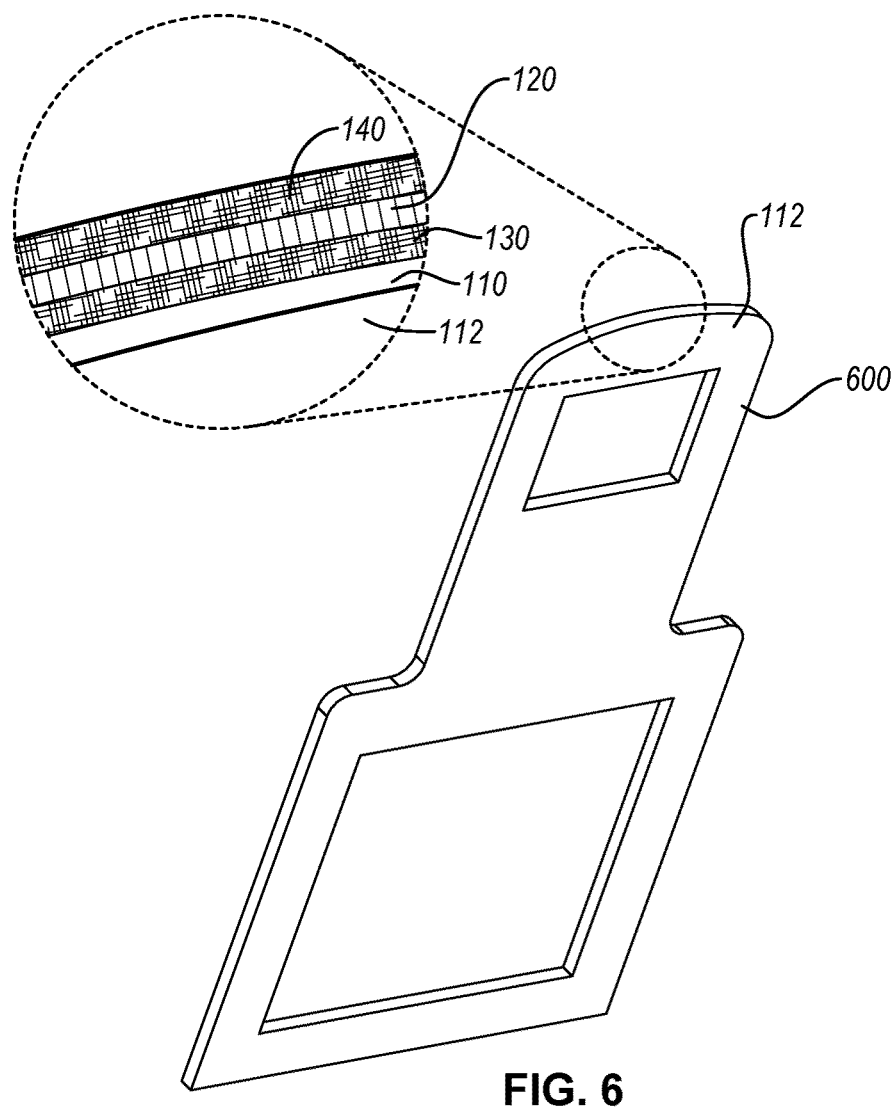
FIG. 6 is an isometric view of a seatback, according to an embodiment.

FIG. 6 is an isometric view of a seatback 600, according to an embodiment. The seatback 600 may be formed from a composite sandwich. The layers of the composite sandwich in the seatback 600 may be configured as any of the composite sandwiches disclosed herein. For example, the layers of the composite sandwich in the seatback 600 may include the thermoplastic layer 110, the thermoset layers 130 and 140, and the core 120. The seatback 600 may be configured such that the thermoplastic layer 110 of the composite sandwich may face outward thereby forming the outermost surface 112. The thermoplastic layer 110 may be disposed on the thermoset layer 130, which is disposed on the core 120, which is disposed on the additional thermoset layer 140. The additional thermoset layer 140 may face inwardly (e.g., away from the outermost surface 112). Such configuration may provide a seatback 600 with a relatively low heat release on the surface of the seatback that faces a person sitting behind the seat on which the seatback is located, while still providing relatively high strength, light weight, and discoloration-resistant surface for the seatback 600.

Figure 7:
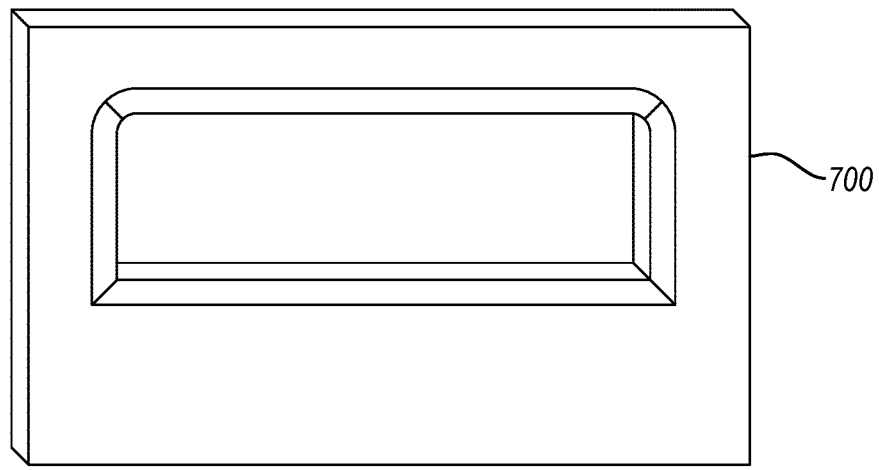
FIG. 7 is a front view of a panel, according to an embodiment.

FIG. 7 is a front view of a panel 700, according to an embodiment. The panel 700 may be formed from any of the composite sandwiches disclosed herein. The panel 700 may be configured as an interior panel of a train car (e.g., subway or light rail car). The panel 700 may have molding for additional components to fit therein, such as a window or door.

While the thermoplastic layers herein are disclosed as being used in composite sandwiches (e.g., laminates), components having the thermoplastic layer can be further used to form monolithic components. For example, a thermoplastic resin may be used to form a monolithic component or structure, such as any of the components disclosed herein (e.g., automotive, marine, aircraft, rail, etc.). In an example, a thermoplastic layer may be used to form a component from a single monolithic layer of the resin. In some examples, the monolithic layer of thermoplastic resin may include a plurality of fibers therein. The monolithic components may be molded to form a specific shape as disclosed herein with respect to composite laminates. Examples of such monolithic components could include panels (e.g., vehicle body panels such as car hoods, vehicle interior panels such as interior bulkheads, dashboards, moldings, electrical panels, etc.), seat components, tables, trays, storage bins (e.g., overhead storage) or other storage container panels, or any other components disclosed herein.

In some examples, monolithic components can be formed using RTM. In some examples, monolithic components can be formed from a pre-preg of a plurality of fibers containing a thermoplastic resin thereon.

Figure 8:
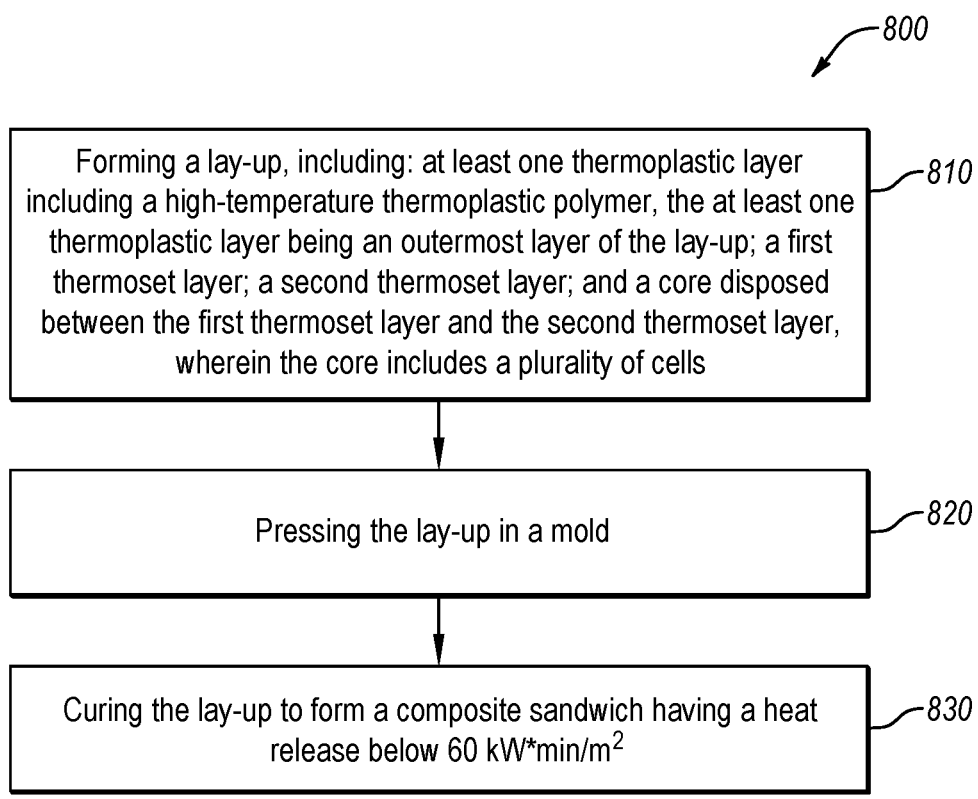
FIG. 8 is a flow chart of a method of making a composite, according to an embodiment.

FIG. 8 is a flow chart of a method 800 of making a composite sandwich structure according to an embodiment. The method includes an act 810 of forming a lay-up, including at least one thermoplastic layer including a high-temperature thermoplastic polymer, the at least one thermoplastic layer being an outermost layer of the lay-up; a first thermoset layer; a second thermoset layer; and a core disposed between the first thermoset layer and the second thermoset layer, wherein the core includes a plurality of cells; an act 820 of pressing the lay-up in a mold; an act 830 of curing the lay-up to form a composite sandwich having a heat release below 60 kW*min/m². In some examples, additional acts may be included in the method 800. In some examples, the acts 810-830 may be performed in different order than presented or one or more acts may be omitted.

The act 810 of forming a lay-up may include providing the components of the lay-up separately or as separate layers of the composite sandwich structure. The lay-up may be an as yet uncured set of layers (e.g., stack) of a structural component to be formed. The lay-up may include any combination of any of the layers disclosed herein, such as at least one thermoplastic layer including a high-temperature thermoplastic polymer; a first thermoset layer; a second thermoset layer; and a core disposed between the first thermoset layer and the second thermoset layer, wherein the core includes a plurality of cells. In such examples, the at least one thermoplastic layer being an outermost layer of the lay-up.

In some examples, forming a lay-up may include forming one or more of the components of the lay-up separately or as separate layers of the composite sandwich structure. For example, forming a lay-up may include applying a thermoset resin (e.g., epoxy-polyurethane resin) onto a plurality of fibers (e.g., glass fabric or carbon fiber fabric) to form one or more of the first thermoset layer or the second thermoset layer. The thermoplastic or thermoset may be applied to the plurality of fibers by one or more of spraying or manually spreading (e.g., by trowel, roller, brush, or spatula). In some examples, more thermoplastic content may be added to one side of the plurality of fibers to improve the surface finish. The thermoplastic and/or thermoset may wet or embed in the plurality of fibers. The polyurethane in the thermoset resin may have a relatively low viscosity while the epoxy has a relatively high viscosity. However, the epoxy may be warmed up to reduce viscosity for spraying by using a pressure pot or commercial spray heads. The thermoplastic may be pressed into the plurality of fibers, such as in a mold (e.g., a heat mold). In some examples, the thermoplastic may be applied to the plurality of fibers as a solid (e.g., powder) and may subsequently be melted, such as in a mold, to infiltrate into the plurality of fibers. In some examples, the thermoplastic or thermoset may be present in the plurality of fibers as a pre-preg fiber sheet or fabric. In such examples, the more thermoplastic may be added to the pre-preg, such as to provide a selected finish or thermoplastic content to the thermoplastic layer. In some examples, the thermoplastic may be evenly distributed throughout the pre-preg. In some examples, the thermoplastic (e.g., thermoplastic powder) may be present in a greater amount on an outside surface of a plurality of fibers (e.g., fiber fabric sheet) of the pre-preg, such as to provide a selected surface finish.

In some examples, the at least one thermoplastic layer may include a first thermoplastic layer and the first thermoset layer is disposed on the first thermoplastic layer. The at least one thermoplastic layer may include any of the thermoplastic layers disclosed herein (e.g., high-temperature thermoplastic resins, pluralities of fibers, or the like). In such examples, the first thermoset layer may include an epoxy-polyurethane resin on a first plurality of glass fibers or carbon fibers and the second thermoset layer may include the epoxy-polyurethane resin on a second plurality of glass fibers or carbon fibers. The core may include any of the cores disclosed herein, such as a plurality of tubes bonded together in parallel, a honeycomb core, or a foam body. For example, the core may have any of the characteristics of any of the core disclosed herein, such as a thickness of less than 5 mm (e.g., 4 mm) prior to pressing, material composition, or the like.

In some examples, the lay-up may include at least one thermoplastic layer, at least one thermoset layer, at least one core positioned between the first and second thermoset layers, and optionally, one or more additional layers (e.g., metal layer(s), such as aluminum). In some examples, forming a lay-up may include providing one or more of at least one thermoplastic layer, at least one thermoset layer, or a core. For example, forming the lay-up may include positioning any of the thermoplastic layers disclosed herein into a mold.

In some examples, forming a lay-up may include stacking or otherwise disposing the layers of the lay-up in the mold. The mold may be sized and shaped to provide a selected form of a part (e.g., seatback, armrest, overhead bin, etc.). The mold may have two or more mold portions disposed on a press, wherein each of the mold portions are positioned on press heads to be pressed together to compress any material(s) (e.g., thermoset and thermoplastic layers) therebetween. Forming the lay-up may include positioning any of the thermoset layers disclosed herein into the mold, such as on the thermoplastic layer. Forming the lay-up may include positioning any of the thermoset layers disclosed herein into the mold, such as on the thermoplastic layer. Forming the lay-up may include positioning any of cores disclosed herein into the mold, such as on the thermoset layer. For example, the core may be disposed on the thermoset layer, or vice versa, where the open ends of the plurality of cells of the core are interfaced by the thermoset layer. Forming the lay-up may include positioning an additional thermoset layer into the mold, such as on the opposite the side of the core from the first thermoset layer. For example, the second thermoset layer may be positioned on the core where the second set of open ends of the plurality of cells of the core are interfaced by the second thermoset layer. In some examples, the core may not extend along the entire lateral dimension(s) of the thermoset layer(s) and/or thermoplastic layer(s).

Forming a lay-up may include providing a fiber layer (e.g., plurality of fibers) and then adding one or more of a thermoset or thermoplastic to the fiber layer. For example, a glass fabric may be provided and a thermoplastic resin or a thermoset resin may be applied onto the glass fabric. Any of the pluralities of fibers disclosed herein may be used to form a thermoset layer or thermoplastic layer. For example, carbon fiber fabrics or even high melting temperature (e.g., Tg is at least about 200° C.) thermoplastic fiber fabrics may be used. Upon pressing, the thermoplastic resin or thermoset resin may infiltrate into the glass fabric and harden upon curing to form a cured thermoplastic layer or thermoset layer. The thermoset resin or thermoplastic resin may be applied in liquid or solid form. For example, PEI powder may be sprinkled onto a fiber layer to at least partially form the thermoplastic layer. In some examples, the thermoset resin or thermoplastic resin may be heated to a suitable viscosity for spraying and may be sprayed onto a fiber fabric (e.g., plurality of fibers). For example, forming the lay-up may include applying a thermoset resin onto a fiber fabric and a second fiber fabric (e.g., layers 130 and 140) such as to at least partially impregnate the first and second fiber fabrics with the thermoset resin. In some examples, spraying the thermoplastic resin or the thermoset resin may be carried out at a pressure of less than about 90 psi onto the fiber fabric. In some examples, the thermoset resin or thermoplastic resin may be manually spread onto the fiber fabric. In some examples, the plurality of fibers may be provided as a pre-preg material, that is, a plurality of fibers containing at least some of the thermoset resin or thermoplastic resin, depending on the layer. In some examples, the first thermoset layer may include a plurality of glass fibers having a density of 200 grams per square meter ("gsm") and the second thermoset layer may include a plurality of carbon fibers having a density of 300 gsm.

In some examples, other lay-up configurations may be provided and positioned in the mold. For example, more or fewer components may be utilized in the lay-up than those described in the example above. In some examples, the lay-up may contain only a thermoplastic layer disposed on a thermoset layer, or only a thermoplastic layer, a thermoset layer, and a core. In some examples, the position of the layers of the lay-up may differ from the examples provided above.

For example, the at least one thermoplastic layer may include a first thermoplastic layer and a second thermoplastic layer disposed on the first thermoplastic layer where the first thermoplastic layer is the outermost layer in the lay-up. In such examples, the first thermoset layer may be disposed on the second thermoplastic layer. Additionally, the plurality of cells may include one or more of a plurality of tubes bound together in parallel or a polymethacrylimide-based foam body. In such examples, the first thermoplastic layer may include a polyetherimide resin, the second thermoplastic layer may include a plurality of fibers in polyetherimide resin, first thermoset layer may include an epoxy-polyurethane resin on a first plurality of glass fibers or carbon fibers, and the second thermoset layer may include the epoxy-polyurethane resin on a second plurality of glass fibers or carbon fibers. In such examples, the thermoplastic resin in one or more of the thermoplastic layers may include any of the thermoplastics disclosed herein and the thermoplastic resin in one or more of the thermoplastic layers may include any of the thermoplastic resins disclosed herein.

In some examples, the at least one thermoplastic layer may include a first thermoplastic layer and a second thermoplastic layer disposed on the second thermoset layer. In such examples, the first thermoplastic layer may be the outermost layer in the lay-up and the second thermoplastic layer may be the innermost layer (e.g., the layer most distant from the outermost layer or surface) in the lay-up. In such examples, the first thermoset layer may be disposed on the first thermoplastic layer. The core may be disposed on directly or indirectly on the first thermoset layer. The plurality of cells may include one or more of a plurality of tubes bound together in parallel or a foam body (e.g., polymethacrylimide-based foam body). The second thermoset layer may be disposed directly or indirectly on the core. In such examples, the second thermoplastic layer may be disposed on the second thermoset layer, such as to form the innermost surface of the lay-up. It should be understood that both the outermost and innermost surfaces may be external surfaces in a structure formed from the composite sandwich. In such examples, the first thermoplastic layer and the second thermoplastic layer may include a polyetherimide resin. The first thermoset layer may include an epoxy-polyurethane resin on a first plurality of glass fibers or carbon fibers and the second thermoset layer may include the epoxy-polyurethane resin on a second plurality of glass fibers or carbon fibers. In some examples, the lay-up may include a third thermoplastic layer disposed between the first thermoplastic layer and the first thermoset layer and a fourth thermoplastic layer disposed between the second thermoplastic layer and the second thermoset layer. In such examples, one or more of the third thermoplastic layer or the fourth thermoplastic layer may include plurality of fibers therein.

Forming a lay-up may include providing a pre-molded thermoplastic layer. For example, forming the lay-up may include pre-molding the thermoplastic layer and disposing the first thermoset layer, the core, and the second thermoset layer thereon onto the pre-molded thermoplastic layer. For example, a plurality of fibers bearing thermoplastic resin thereon and/or therein may be pressed in the mold, heated to a curing temperature, and cooled to form a pre-molded thermoplastic layer. The remaining layers of the lay-up may be positioned in/on the pre-molded thermoplastic layer to provide at least a rough contour of the finished (e.g., molded) part. Accordingly, upon pressing the pre-molded thermoset layer and the remaining materials in the lay-up may be more readily pressed into the corners of the mold to give the full final form of the part defined by the mold.

Pre-molding the thermoset layer is particularly effective with glass fibers or carbon fibers, as glass fibers and carbon fibers do not deform or stretch very much, if at all, compared to polymer fibers. Accordingly, by pre-molding the thermoset layer and placing the remaining components of the lay-up on the pre-molded thermoset layer, the thermoset layer containing glass fibers can be molded to at least near the final shape of the mold and the remaining components can be manipulated into the pre-molded portions of the thermoset layer to more readily provide the final shape of the molded part. This cuts down on incomplete molding, particularly in the thermoset layer(s), such as lack of complete definition in corners of the molded part. Forming the lay-up may include abrading the pre-molded thermoset layer on a surface that is intended to be bound to the thermoset layer, such as with a scouring pad, steel wool, a file, or any other tool suitable for abrading a surface.

The act 820 of pressing the lay-up in a mold may include closing the mold and further include applying an external pressure to the mold, such as to compress one or more components (e.g., layers) therein. Method 800 may also optionally include vacuuming the cavity of the mold. For example, it may be desired to vacuum the mold to remove the trapped air in the plurality of fibers and/or resins of various layers when the composite sandwich structure is formed. The mold may be shaped and sized to form any of the components or structures disclosed herein, such as to form a panel for communication equipment, an exterior body panel, an interior body panel, a frame, a dashboard, a molding, a seat component, a table, a tray, a storage bin or the like.

Pressing the mold may include applying pressure to at least partially close the mold to form a composite sandwich structure (e.g., a composite laminate) having the shape of the mold and/or at least partially collapse the core. The pressure applied on the lay-up may be sufficient to at least partially collapse the core and/or to at least partially force air out of the plurality of fibers in one or more of the thermoplastic layer(s) of the thermoset layer(s). Suitable techniques for compressing composite laminate structures in molds are disclosed in International Patent Application No. PCT/US15/34070, filed on 3 Jun. 2015; International Patent Application No. PCT/US15/34061, filed on 3 Jun. 2015; and International Patent Application No. PCT/US15/34072, filed on 3 Jun. 2015; the disclosure of each of which is incorporated herein, in its entirety, by this reference.

In some examples, heat may be simultaneously applied to at least partially heat one or more of the thermoset layer(s), thermoplastic layer(s), the core, or any materials in the lay-up. For example, pressing the lay-up in a mold may include pressing the lay-up in a heated mold. The core may become more pliable upon application of heat during pressing, such that the core at least partially softens or melts, while compressing to increase compliance with the shape of the mold. The polyurethane may more readily form microfoams upon application of heat during pressing. The mold or press may also include one or more heat elements to apply heat to the lay-up while pressing the lay-up in the mold. The thermoset and/or thermoplastic resin may at least begin curing upon application of heat in the mold.

The act 830 of curing the lay-up to form a composite sandwich having a heat release below 60 kW*min/m$^2$ may include heating the lay-up in the mold. Curing the lay-up may include at least partially curing one or more of the thermoset resin(s) of the thermoset layer(s) or thermoplastic resin(s) of the thermoplastic layer(s) in the lay-up. For example, curing the lay-up may include heating the thermoset resin, composite laminate, or composite sandwich, in one or more of the mold, a kiln, or an oven. Curing the lay-up to form a composite sandwich may include curing the lay-up in the mold, such as heating the lay-up in the mold, while applying pressure to the lay-up.

Curing the thermoset resin and/or thermoplastic resin may include heating the fiber sandwich structure or a precursor thereof (such as a stack) containing the respective resin (in the mold or outside of the mold) to about 110° C. or more, such as about 120° C. to about 200° C., about 130° C. to about 180° C., about 140° C. to about 160° C., about 120° C., about 130° C., about 140° C., or about 160° C. Depending on the composition of the resin, curing the thermoset resin or thermoplastic resin may take place over a duration of about 40 seconds or more, such as about 40 seconds to about 1 day, about 1 minute to about 12 hours, about 90 seconds to about 8 hours, about 2 minutes to about 4 hours, about 40 seconds to about 10 minutes, about 1 minute to about 8 minutes, about 5 minutes to about 20 minutes, about 8 minutes to about 15 minutes, about 90 seconds to about 5 minutes, about 3 minutes, about 6 minutes or less, about 8 minutes or less, or about 20 minutes or less. In some examples, curing the lay-up may be carried out in the mold, such as by heating the lay-up to at least a curing temperature of the thermoset(s) in the lay-up. In some examples, curing (heating) the lay-up may be partially carried out in the mold and then may be completed in a different location such as an oven or kiln. The resulting cured composite sandwich structure may exhibit the shape defined by the mold. The resulting cured composite sandwich structure may have any of the heat release values disclosed herein such as a heat release below 60 kW*min/m$^2$, below 50 kW*min/m$^2$, below 40 kW*min/m$^2$, below 30 kW*min/m$^2$, or below 25 kW*min/m$^2$.

Curing the lay-up may include allowing the lay-up to cool to ambient temperature after pressing the lay-up in the mold. In some examples, cooling the pressed lay-up may be carried out separately from curing the lay-up. For example, the method 800 may further include cooling the lay-up (e.g., now at least partially cured composite sandwich structure) after curing the lay-up. For example, the at least partially cured sandwich structure may be allowed to cool in ambient temperature, a refrigerated environment, by passing air over the sandwich structure, or by passing the lay-up through a cooling tunnel.

In some examples, a composite part may not include a core. For example, a thermoplastic layer may be applied to a monolithic part, such as a pre-preg fiber component or an RTM molded component. For example, a pre-preg fiber sheet containing a thermoset resin may be disposed in a mold and a PEI thermoplastic layer may be disposed on the pre-preg prior to pressing and heating the respective layers. The PEI thermoplastic layer provide a selected surface finish or appearance. In some examples, a thermoplastic layer may be disposed on a side of a fiber sheet in an RTM mold, wherein a thermoset resin may be injected into the RTM mold to at least partially impregnate the fiber sheet with the thermoset resin. The resulting thermoplastic (e.g., PEI) layer on the thermoset may provide a selected surface finish or appearance to the final part.

Figure 9:
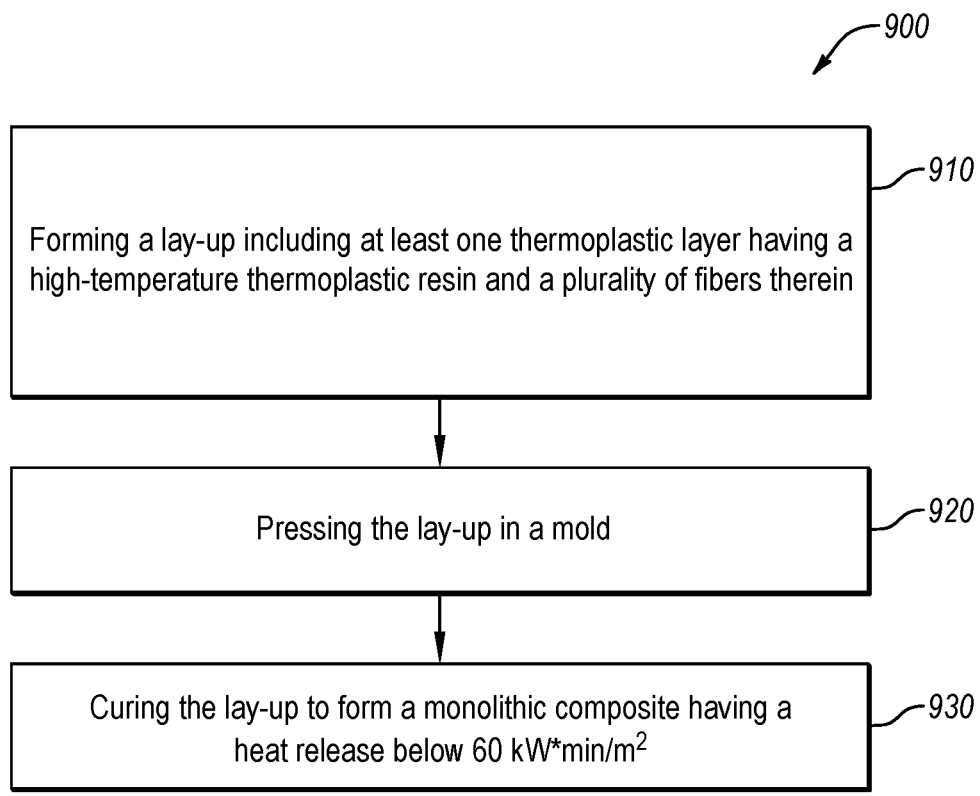
FIG. 9 is a flow chart of a method of making a monolithic composite, according to an embodiment.

FIG. 9 is a flow chart of a method 900 of making a monolithic composite, according to an embodiment. The method 900 includes an act 910 of forming a lay-up including at least one thermoplastic layer having a high-temperature thermoplastic resin and a plurality of fibers therein; an act 920 of forming the lay-up into a selected shape; and an act 930 of curing the lay-up to form a monolithic composite. In some examples, the acts 910, 920, or 930 may be performed in different order than presented or one or more acts may be omitted. In some examples, additional acts may be included in the method 900. For example, embodiments of method 900 also can include an act of painting or coating one or more outermost surface(s) of the at least one polymer layer with at least one of paint or a vinyl adhesive sticker. One or more portions of the method 900 may be similar or identical to any portions of the methods 800 in one or more aspects.

The act 910 of forming a lay-up including at least one thermoplastic layer having a high-temperature thermoplastic resin and a plurality of fibers therein may include providing or forming at least one thermoplastic layer having any of the high temperature thermoplastic resins and any of the pluralities of fibers disclosed herein. The lay-up may include one or more layers, such as one to ten layers, one to three layers, one or three layers, three to 5 layers, or only one layer. Forming a lay-up including at least one thermoplastic layer having a high-temperature thermoplastic resin and a plurality of fibers may include forming a plurality of layers having any of the high temperature thermoplastic resins and any of the pluralities of fibers disclosed herein. In such examples, the plurality of polymer layers may include any of the polymer layers disclosed herein, such as the first layer 510, the second layer 520, and the third layer 530. The act 910 of forming a lay-up may include forming one or more of the first layer 510, the second layer 520, or the third layer 530.

The high-temperature thermoplastic resin in the any of plurality of layers, such as the at least one thermoplastic layer, may be similar or identical in one or more aspects to the high temperature thermoplastic resin in any of the adjacent or remaining layers of the lay-up. For example, each of the layers in the lay-up may include a PEI resin therein. In such examples, the amount of resin in each layer may differ or be identical.

The plurality of fibers in the any of plurality of layers may be similar or identical in one or more aspects to the plurality of fibers in any of the adjacent or remaining layers of the lay-up. For example, each of the layers in the lay-up may include a glass fibers, carbon fibers, thermoplastic fibers, or the like. In such examples, the amount, density, or thickness of the plurality of fibers layer may differ or be identical in each layer. The plurality of fibers in the any of plurality of layers may be different in one or more aspects to the plurality of fibers in any of the adjacent or remaining layers of the lay-up. For example, some of the layers in the lay-up may include a glass fibers and some of the layers in the lay-up may include carbon fibers. The combinations of components in the layers of the monolithic composite 500 may include any combination of any of the components (e.g., polymer resin, plurality of fibers, or characteristics of the layers) disclosed herein.

Forming the at least one polymer layer may include forming at least one layer having a polymer resin (e.g., high temperature thermoplastic resin or thermoset resin) and the plurality of fibers (e.g., any of the pluralities of fibers herein). For example, forming the at least one polymer layer may include applying a polymer resin onto the plurality of fibers. Applying the polymer resin may include spraying, manually spreading, pouring, or otherwise applying the polymer resin onto the plurality of fibers. The polymer resin may be applied in liquid, semi-solid, or solid form. In some examples, the polymer resin and the plurality of fibers may be provided in a pre-preg and forming the at least one polymer layer may include providing the pre-preg. Forming the at least one polymer layer may include pre-molding one or more of the at least one polymer layers, such as the at least one thermoplastic layer.

The at least one thermoplastic layer and any additional layers in the lay-up may be an as yet uncured layer or layers (e.g., stack) of a structural component to be formed. The lay-up may include the at least one thermoplastic layer having a high temperature thermoplastic resin; a second polymer layer (e.g., thermoplastic or thermoset resin on a second plurality of fibers) disposed on the at least one thermoplastic layer; and at least third polymer layer (e.g., thermoplastic or thermoset resin on at least a third plurality of fibers). Accordingly, the at least one thermoplastic layer and resulting monolithic composite structure include at least one outermost surface having high-temperature thermoplastic material therein. Such examples provide relatively low heat release (less than 60 kW*min/m$^2$) from compared to monolithic composites formed without the high temperature thermoplastic layer.

The act 920 of forming the lay-up into a selected shape may include pressing the lay-up in a mold. For example, forming the lay-up into a selected shape may include positioning one or more of the first layer 510, the second layer 520, or the third layer 530 in the mold. The mold may be as described above with respect to the method 800. Pressing the lay-up having the at least one thermoplastic layer in a mold may be carried out as described above with respect to the method 800, in one or more aspects. For example, pressing the lay-up into a selected shape in a mold may include heat pressing the at least one thermoplastic layer. Forming the lay-up into a selected shape positioning any of the layers disclosed herein into the mold, such positioning the first layer 510 in the mold, the second layer 520 on the first layer 510, and the third layer 530 on the second layer 520. In some examples, one or more of the second layer 520 or the third layer 530 may be omitted in the lay-up for the monolithic composite.

Forming the lay-up into a selected shape may include closing the mold and pressing the at least one thermoplastic layer therein. Forming the lay-up into a selected shape may include pressing the at least one thermoplastic layer in the mold for a select time. Forming the lay-up into a selected shape may include placing the at least one thermoplastic layer on a template or frame. The shape of the mold or molded lay-up may include any of those shapes or composite components disclosed herein, such as a vehicle body panel, a seat component, a vehicle interior panel, a storage container panel, or the like.

Upon or after pressing, the polymer resin(s) may infiltrate into the plurality of fibers of each respective layer and harden upon curing to form a cured thermoplastic layer disposed on one or more cure polymer layers.

The act 930 of curing the lay-up to form a monolithic composite having a heat release below 60 kW*min/m$^2$ may be similar or identical to the act 830 of curing the lay-up to form a composite sandwich having a heat release below 60 kW*min/m$^2$ as described above with respect to the method 800, in one or more aspects. For example, curing the lay-up may include curing the at least one thermoplastic layer to form a monolithic composite part having any of the heat release values disclosed herein.

Curing the lay-up may include heating the monolithic layer(s) in the mold to a curing temperature of the polymer resin(s) therein. Curing the lay-up (e.g., curing one or more thermos plastic or thermoset resins therein) may include cooling the lay-up from the curing temperature such as to an below the curing temperature via removing from the mold, cooling in ambient air, cooling in a refrigerated environment, or the like. In some examples, the method 900 may include removing the monolithic composite part from the mold.

The method 900 may further include cooling the lay-up (e.g., now at least partially cured monolithic composite) after curing. For example, the at least partially cured monolithic composite structure may be allowed to cool in ambient temperature, a refrigerated environment, a cooling tunnel, or by otherwise passing air over the monolithic composite.

The method 900 may include utilizing resin transfer molding or a pre-preg to at least partially form the composite structure. For example, the plurality of fibers may be placed into a lay-up in a mold and thermoplastic resin may be injected into the mold such that the resin impregnates the plurality of fibers in the lay-up to form an as-yet uncured composite laminate structure. In some examples, a lay-up including a pre-preg may be disposed within a mold and pressed in the mold to form a part.

The method 900 may include trimming flashing from the monolithic composite part after curing. In some examples, the monolith composite part may be painted, pigmented, covered with a sticker (e.g., vinyl), or otherwise presented with a selected color, texture, and appearance, prior to or after curing.

WORKING EXAMPLES

Working Example A was formed according to the following procedure. A plain weave glass skin was provided. A grey pigment PEI was applied to the glass skin to form the PEI (thermoplastic) layer. The PEI was 33 wt % of the PEI layer with the glass fibers forming the remainder of the layer. The PEI layer was pressed and heated to 310° C. at 10 bars of pressure for 1 minute. A 220 gsm (grams per square meter) glass skin containing an epoxy/polyurethane thermoset resin was applied to the PEI layer. A core having a plurality of 4 mm thick (e.g., from open end to open end) PEI tubes was disposed on the still wet (uncured) thermoset layer. A NCF carbon fiber sheet (300 gsm) having an epoxy/polyurethane resin applied thereto was disposed on the opposite side of the core from the first thermoset layer to form the lay-up of Working Example A. The lay-up was pressed and cured to solidify the thermosets to form Working Example A. Working Example A was about 4.6 mm thick and planar.

Working Example B was formed according to the following procedure. A plain weave glass skin was provided. A grey pigment PEI was applied to the glass skin to form the PEI (thermoplastic) layer. The PEI was 33 wt % of the PEI layer with the glass fibers forming the remainder of the layer. The PEI layer was pressed and heated to 310° C. at 10 bars of pressure for 1 minute. A 220 gsm glass skin containing an epoxy/polyurethane thermoset resin was applied to the PEI layer. A 13 mm thick polycarbonate honeycomb core was disposed on the still wet (uncured) thermoset layer. A NCF carbon fiber sheet (300 gsm) having an epoxy/polyurethane resin applied thereto was disposed on the opposite side of the core from the first thermoset layer to form the lay-up of Working Example B. The lay-up was pressed and cured to solidify the thermosets to form Working Example B. Working Example B was about 9.0 mm thick and planar.

Working Example C was formed according to the following procedure. A grey pigment PEI was applied to the glass skin to form the PEI (thermoplastic) layer. The PEI was 33 wt % of the PEI layer with the glass fibers forming the remainder of the layer. The PEI layer was pressed and heated to 310° C. at 10 bars of pressure for 1 minute. A 220 gsm glass skin containing an epoxy/polyurethane thermoset resin was applied to the PEI layer. A 20 mm thick polyurethane foam core was disposed on the still wet (uncured) thermoset layer. A NCF carbon fiber sheet (300 gsm) having an epoxy/polyurethane resin applied thereto was disposed on the opposite side of the core from the first thermoset layer to form the lay-up of Working Example C. The lay-up was pressed and cured to solidify the thermosets to form Working Example C. Working Example C was about 18.5 mm thick and planar.

Working Example D was formed according to the following procedure. A grey pigment PEI was applied to the glass skin to form the PEI (thermoplastic) layer. The PEI was 33 wt % of the PEI layer with the glass fibers forming the remainder of the layer. The PEI layer was pressed and heated to 310° C. at 10 bars of pressure for 1 minute. A 220 gsm glass skin containing an epoxy/polyurethane thermoset resin was applied to the PEI layer. A 13 mm thick polyurethane free rise foam was used for the foam core which was disposed on the still wet (uncured) thermoset layer. A NCF carbon fiber sheet (300 gsm) having an epoxy/polyurethane resin applied thereto was disposed on the opposite side of the core from the first thermoset layer to form the lay-up of Working Example D. The lay-up was pressed and cured to solidify the thermosets to form Working Example D. Working Example D was about 11 mm thick and planar.

Comparative Example 1 was formed. Comparative example 1 included an 80 gsm glass fabric containing an epoxy/polyurethane thermoset, a 0.1 mm thick aluminum foil disposed on the glass fabric, a 220 gsm glass fabric containing an epoxy/polyurethane thermoset was disposed on the aluminum layer, a core containing a plurality of 4 mm thick (e.g., tall) PEI tubes was disposed on the 220 gsm glass fabric layer, and a NCF carbon fiber sheet (300 gsm) having an epoxy/polyurethane resin applied thereto was disposed on the opposite side of the core from the 220 gsm glass fabric layer. The face of the 80 gsm glass fabric layer was painted to provide a selected color. Comparative Example 1 was planar.

Three samples of each of Working Example A-D and Comparative Example 1 were tested for heat release according to the testing procedures set forth in 14 C.F.R. pt. 25, Appendix F, Part IV(a)-(h) (2011). Testing revealed that Working Example A had an average heat release of 24.0 kW*min./m² and an average peak heat release of 26.7 kW*min./m². at about 110 seconds. Testing revealed that Working Example B had an average heat release of 6.0 kW*min./m² and an average peak heat release of 146.7 kW*min./m² at about 167 seconds. Testing revealed that Working Example C had an average heat release of 11.7 kW*min./m² and an average peak heat release of 45.9 kW*min./m² at about 290 seconds where the heat release was still rising at the end of the test. Testing revealed that Working Example D had an average heat release of 91.8 kW*min./m² and an average peak heat release of 158.2 kW*min./m² at about 130 seconds. Testing also revealed that Comparative Example 1 had an average heat release of 86.8 kW*min./m² and an average peak heat release of 105.9 kW*min./m² at about 130 seconds.

The heat release values of Working Example A was surprising as it was initially believed that the heat release would we similar or identical to heat release values obtained for purely PEI cores, which were above 40 kW*min./m². It is believed that the PEI thermoplastic outer layer reduces the heat release of Working Example A compared to Comparative Example 1 which utilizes a foil for limiting heat release.

The heat release values for Working Examples B, and D were above satisfactory heat release for aviation, rail, or other applications. It is believed that the thicker cores of Working Examples B, and D (compared to Working Example A) contributed to the relatively high heat release values thereof.

The average heat release of Working Example B was extremely low, 6 kW*min./m², over the test duration prior to the peak heat release (167 seconds). It is currently believed that the polycarbonate core of Working Example B delays heat release compared to non-polycarbonate cores of Working Examples A and D. However, the average peak heat release was very high, 146.7 kW*min./m². It is believed that the relatively thick core (13 mm) of Working Example B contributed to the relatively high average peak heat release of Working Example B. It is also believed that the thickness of the cores of Working Examples B, and D contribute to the relatively high peak release values therein. Accordingly, it may be desirable to utilize a thinner core, such as less than 5 mm thick. It may also be desirable to utilize a polyetherimide or polycarbonate material for the core based on the relatively low heat release values associated therewith.

Working Example C had unexpectedly low heat release values despite having a thicker core, made of polyurethane foam (extremely flammable), and an overall composite thickness greater than the other working examples. Notably, the heat release values had not reached their peak at the end of testing (at about 300 seconds). Accordingly, it is believed the thermoplastic outer layer in combination with the other layers of Working Example C delayed heat release sufficient to pass aviation, rail and other safety standards.

By replacing the aluminum and additional thermoset layer of Comparative Example 1 with the thermoplastic layer of Working Example A, a composite sandwich structure may have a greatly reduced heat release that is well within aviation, rail, or other safety standards. Thus, the costly step of adding an aluminum layer to deflect heat away from the inner components of a composite sandwich structure can be safely omitted by using the composite sandwich structures disclosed herein.

The thermoplastic layers disclosed herein may provide desirable heat release characteristics to a composite sandwich having the thermoplastic layer. By providing thermoplastic layer with a colorant or pigment, the thermoplastic layer may not need to be painted if used as an outer surface. Instead, the colorant or pigment may serve to provide a selected color throughout the thermoplastic layer thereby maintaining color upon being scratched. In such examples, the composite sandwich structure containing the thermoplastic layer may be resistant to color loss due to scratching, thereby eliminating the need to paint an uncolored (e.g., unpigmented) thermoplastic or thermoset outer layer.

The composite sandwiches disclosed herein may have relatively low heat release, high sound absorption, high heat insulation, high bending stiffness, high energy absorption, and light weight. The composite sandwiches may be used in various applications including in the auto industry, aerospace applications (e.g., airplane interiors, seats, bulkheads, etc.), marine applications, agricultural equipment, rail applications (e.g., engine or railcar interiors, seats, bulkheads, etc.), bicycles, satellite applications, construction materials, consumer products (e.g., furniture, toilet seats, and electronic products among others), etc.

While various aspects and embodiments have been disclosed herein, other aspects and embodiments are contemplated. The various aspects and embodiments disclosed herein are for purposes of illustration and are not intended to be limiting.

What is claimed is:

1. A composite sandwich structure, comprising:
a thermoplastic layer including a high-temperature thermoplastic polymer comprising a polyetherimide polymer disposed on a plurality of glass fibers, the thermoplastic layer forming an outermost layer to provide a surface finish;
a first thermoset layer disposed on the thermoplastic layer, the first thermoset layer including a plurality of glass fibers or a plurality of carbon fibers disposed in a first thermoset resin, the first thermoset resin including an epoxy-polyurethane thermoset resin;
a core positioned on the first thermoset layer, wherein the core includes a plurality of cells formed from one or more of polyurethane, polycarbonate, polypropylene, polyphenylene sulfide, polyether ether ketone, polymethacrylimide, or polyetherimide; and
a second thermoset layer disposed on the core substantially opposite the first thermoset layer, the second thermoset layer including a plurality of glass fibers or a plurality of carbon fibers disposed in a second thermoset resin, the second thermoset resin including an epoxy-polyurethane thermoset resin;
wherein the thermoplastic layer compositionally differs from the first thermoset layer and the second thermoset layer; and
wherein the composite sandwich structure has a heat release below 60 kW*min/m$^2$.

2. The composite sandwich structure of claim 1, wherein the high-temperature thermoplastic polymer has a melting point above 200° C.

3. The composite sandwich structure of claim 1, wherein the high-temperature thermoplastic polymer includes one or more of polyether ether ketone, polytetrafluoroethylene, perfluoroalkoxy, polyfluoroethylenepropylene, or polyethylene terephthalate/polybutylene terephthalate.

4. The composite sandwich structure of claim 1, wherein the high-temperature thermoplastic polymer includes polyether ether ketone and the thermoplastic layer includes a colorant therein.

5. The composite sandwich structure of claim 1, wherein:
the thermoplastic layer includes a glass fiber sheet having a density of 80 grams per square meter ("gsm");
the first thermoset layer includes a plurality of glass fibers having a density of 200 gsm; and
the second thermoset layer includes a plurality of carbon fibers having a density of 300 gsm.

6. The composite sandwich structure of claim 1, wherein the plurality of cells includes a plurality of tubes bonded together in a parallel orientation or a polymer foam.

7. The composite sandwich structure of claim 1, wherein the composite sandwich structure has a heat release below 30 kW*min/m$^2$.

8. A method of making a composite sandwich structure, the method comprising:
forming a lay-up, including:
at least one thermoplastic layer including a high-temperature thermoplastic polymer comprising a polyetherimide polymer disposed on a plurality of glass fibers, the at least one thermoplastic layer being an outermost layer of the lay-up to provide a surface finish;
a first thermoset layer disposed on the thermoplastic layer, the first thermoset layer including a plurality of glass fibers or a plurality of carbon fibers disposed in a first thermoset resin, the first thermoset resin including an epoxy-polyurethane thermoset resin;
a second thermoset layer including a plurality of glass fibers or a plurality of carbon fibers disposed in a second thermoset resin, the second thermoset resin including an epoxy-polyurethane thermoset resin; and
a core disposed between the first thermoset layer and the second thermoset layer, wherein the core includes a plurality of cells formed from one or more of polyurethane, polycarbonate, polypropylene, polyphenylene sulfide, polyether ether ketone, polymethacrylimide, or polyetherimide; and
pressing the lay-up in a mold; and
curing the lay-up to form a composite sandwich structure having a heat release below 60 kW*min/m$^2$;
wherein the at least one thermoplastic layer compositionally differs from the first thermoset layer and the second thermoset layer.

9. The method of claim 8, wherein forming a lay-up includes applying the epoxy-polyurethane thermoset resin to a glass fiber fabric to form one or more of the first thermoset layer or the second thermoset layer.

10. The method of claim 8, wherein forming a lay-up includes pre-molding the at least one thermoplastic layer and disposing the first thermoset layer, the core, and the second thermoset layer thereon onto the pre-molded thermoplastic layer.

11. The method of claim 8, wherein:
the at least one thermoplastic layer includes a first thermoplastic layer; and
the first thermoset layer is disposed on the first thermoplastic layer.

12. The method of claim 7, wherein the plurality of cells includes one or more of a plurality of tubes bound together in parallel or a foam body.

13. The method of claim 8, wherein:
the at least one thermoplastic layer includes a first thermoplastic layer and a second thermoplastic layer disposed on the first thermoplastic layer, and the first thermoplastic layer is the outermost layer in the lay-up;
the first thermoset layer is disposed on the second thermoplastic layer; and
the plurality of cells includes one or more of a plurality of tubes bound together in parallel or a polymethacrylimide-based foam body.

14. The method of claim 8, wherein:
the at least one thermoplastic layer includes a first thermoplastic layer forming the outermost layer in the lay-up;
the lay-up further includes a second thermoplastic layer forming an innermost layer;
the first thermoset layer is disposed on the first thermoplastic layer;
the core is disposed on the first thermoset layer and the plurality of cells includes one or more of a plurality of tubes bound together in parallel or a foam body;
the second thermoset layer is disposed on the core; and
the second thermoplastic layer is disposed on the second thermoset layer.

15. The method of claim 14, further comprising:
a third thermoplastic layer disposed between the first thermoplastic layer and the first thermoset layer; and
a fourth thermoplastic layer disposed between the second thermoplastic layer and the second thermoset layer.

16. The method of claim 8, wherein the core has a thickness of 5 mm or less, prior to pressing the lay-up in the mold.

17. The method of claim 8, wherein the composite sandwich structure has a heat release below 30 kW*min/m².

18. The method of claim 8, wherein pressing the lay-up in a mold includes pressing the lay-up in a heated mold.

19. The method of claim 8, wherein curing the lay-up to form the composite sandwich structure includes one or more of heating the lay-up while pressing the lay-up in the mold or allowing the lay-up to cool to an ambient temperature after pressing the lay-up in the mold.

20. The method of claim 8, wherein the mold is configured to form a panel for communication equipment, an exterior body panel, an interior body panel, a frame, a dashboard, a molding, a seat component, a table, a tray, or a storage bin.

\* \* \* \* \*